United States Patent
Vantran et al.

(10) Patent No.: US 9,321,112 B2
(45) Date of Patent: Apr. 26, 2016

(54) POWER SAW TOOL

(75) Inventors: John S. Vantran, Parkton, MD (US); Steven B. McClaskey, North Las Vegas, NV (US); Robert J.B. Hobden, Kingston (CA)

(73) Assignee: BLACK & DECKER INC., New Britain, CT (US)

( * ) Notice: Subject to any disclaimer, the term of this patent is extended or adjusted under 35 U.S.C. 154(b) by 869 days.

(21) Appl. No.: 13/474,086

(22) Filed: May 17, 2012

(65) Prior Publication Data

US 2012/0317823 A1 Dec. 20, 2012

Related U.S. Application Data

(60) Provisional application No. 61/487,520, filed on May 18, 2011.

(51) Int. Cl.
*B23D 49/16* (2006.01)
*B23D 49/00* (2006.01)
(Continued)

(52) U.S. Cl.
CPC .............. *B23D 49/007* (2013.01); *B23D 49/00* (2013.01); *B23D 51/10* (2013.01); *H01H 13/00* (2013.01)

(58) Field of Classification Search
CPC ........ B23D 51/00; B23D 51/01; B23D 49/00; B23D 49/007; B23D 49/008; H01H 3/12; H01H 3/122; H01H 9/00; H01H 9/02; H01H 9/0214; H01H 9/0285; H01H 13/00; H01H 13/08; H01H 2231/048

USPC ....... 30/392–394, 371–378; 200/17 R, 43.17, 200/329, 332–332.2
See application file for complete search history.

(56) References Cited

U.S. PATENT DOCUMENTS

| | | | |
|---|---|---|---|
| 2,411,028 A | 11/1946 | Smith et al. | |
| 2,799,078 A | 7/1957 | Craven | |
| 3,017,908 A | 1/1962 | Higbee | |

(Continued)

FOREIGN PATENT DOCUMENTS

| | | |
|---|---|---|
| DE | 102007039240 A1 | 2/2009 |
| EP | 0582326 | 2/1994 |

(Continued)

OTHER PUBLICATIONS

EP Search Report dated Sep. 7, 2012 for EP Application No. 12168542.4.

(Continued)

*Primary Examiner* — Phong Nguyen
(74) *Attorney, Agent, or Firm* — Stephen R. Valancius

(57) ABSTRACT

A power saw tool including a housing, a motor, and a reciprocating shaft. A blade clamp assembly is mounted to the reciprocating shaft and adapted for gripping a saw blade. The blade clamp assembly includes a main body defining a channel for engaging the saw blade. A latch arm is pivotally attached to the main body and rotatable about a pivot axis. A locking catch extends from the latch arm and retains the saw blade within the channel. A latch release extends from the latch arm. An actuator is provided to selectively engage the latch release and permit removal of the saw blade from the blade clamp assembly. The power saw tool may include a speed limiter housed within the handle grip to delimit rearward travel of the trigger switch, thereby restricting the speed of the motor. The power saw tool may also include a rotatable shoe assembly.

19 Claims, 21 Drawing Sheets

(51) Int. Cl.
   *B23D 51/10*  (2006.01)
   *H01H 13/00*  (2006.01)

(56) References Cited

U.S. PATENT DOCUMENTS

| | | | |
|---|---|---|---|
| 3,221,192 A | 11/1965 | Franklin | |
| 3,309,484 A | 3/1967 | Frenzel | |
| 3,383,943 A | 5/1968 | Piber | |
| 3,496,972 A | 2/1970 | Rees | |
| 3,550,472 A | 12/1970 | Dummer | |
| 3,590,193 A | 6/1971 | Frenzel | |
| 3,632,936 A | 1/1972 | Piber | |
| 3,715,805 A | 2/1973 | Fraser | |
| 3,869,591 A | 3/1975 | Piber | |
| 4,095,072 A | 6/1978 | Piber | |
| 4,097,704 A | 6/1978 | Piber | |
| 4,100,383 A | 7/1978 | Piber | |
| 4,118,614 A | 10/1978 | Leibundgut et al. | |
| 4,118,615 A | 10/1978 | Leibundgut et al. | |
| 4,241,297 A | 12/1980 | Piber et al. | |
| 4,258,798 A | 3/1981 | Campbell et al. | |
| 4,276,461 A | 6/1981 | Piber | |
| 4,285,129 A | 8/1981 | Hoffman | |
| 4,296,290 A | 10/1981 | Peot | |
| 4,441,255 A | 4/1984 | Hoffman | |
| 4,470,196 A | 9/1984 | Hoffman | |
| 4,594,781 A | 6/1986 | Hoffman | |
| 4,601,477 A | 7/1986 | Barrett et al. | |
| 4,648,182 A | 3/1987 | Hoffman | |
| 4,649,245 A | 3/1987 | Lessig et al. | |
| 4,660,019 A | 4/1987 | Bauer et al. | |
| 4,665,290 A | 5/1987 | Piber | |
| 4,734,629 A | 3/1988 | Lessig, III et al. | |
| 4,737,661 A | 4/1988 | Lessig et al. | |
| 4,802,396 A | 2/1989 | Kuklinski et al. | |
| 4,864,083 A | 9/1989 | Bittel | |
| 4,968,922 A | 11/1990 | Bittel | |
| 4,998,589 A * | 3/1991 | Wiesendanger | 173/170 |
| 5,195,164 A | 3/1993 | Lambert | |
| 5,263,972 A | 11/1993 | Evans et al. | |
| 5,414,793 A * | 5/1995 | Morikawa | 388/824 |
| 5,439,472 A | 8/1995 | Evans et al. | |
| 5,458,346 A | 10/1995 | Briggs | |
| 5,473,820 A | 12/1995 | Neubert et al. | |
| 5,595,250 A | 1/1997 | Bourke et al. | |
| 5,697,279 A | 12/1997 | Schnizler et al. | |
| 5,722,309 A | 3/1998 | Seyerle | |
| 5,729,904 A | 3/1998 | Trott | |
| 5,839,196 A | 11/1998 | Trott | |
| 5,848,473 A | 12/1998 | Brandenburg | |
| 5,940,977 A | 8/1999 | Moores et al. | |
| D415,401 S | 10/1999 | Imboden et al. | |
| 6,104,105 A | 8/2000 | Schaeffeler et al. | |
| 6,105,482 A | 8/2000 | Garcia et al. | |
| 6,234,255 B1 | 5/2001 | Feldmann et al. | |
| 6,273,302 B1 | 8/2001 | Fornaro | |
| D450,552 S | 11/2001 | Mason | |
| 6,317,988 B1 | 11/2001 | Tachibana et al. | |
| 6,318,189 B1 | 11/2001 | Donaldson | |
| 6,518,719 B1 | 2/2003 | Suzuki et al. | |
| 6,555,773 B1 | 4/2003 | Broghammer et al. | |
| 6,568,089 B1 * | 5/2003 | Popik et al. | 30/392 |
| 6,694,625 B1 | 2/2004 | Wright | |
| 6,857,348 B1 | 2/2005 | Mason | |
| 7,015,409 B2 * | 3/2006 | Duffek et al. | 200/332.2 |
| 7,024,779 B1 | 4/2006 | Wright | |
| D538,617 S | 3/2007 | Aglassinger | |
| 7,210,232 B2 | 5/2007 | Guo | |
| 7,395,873 B2 * | 7/2008 | Nakamura et al. | 173/93.5 |
| 7,401,663 B2 | 7/2008 | Craven et al. | |
| 7,476,821 B1 | 1/2009 | Knuppel | |
| 7,493,698 B2 | 2/2009 | Lee | |
| 7,748,125 B2 | 7/2010 | Rakaczki | |
| 7,913,403 B1 | 3/2011 | Willetts | |
| 7,926,187 B2 | 4/2011 | Uehlein-Proctor et al. | |
| 8,112,895 B2 | 2/2012 | Rakaczki | |
| 8,156,655 B2 | 4/2012 | Gatten | |
| 2003/0167643 A1 | 9/2003 | Bigden | |
| 2004/0144553 A1 | 7/2004 | Ashbaugh | |
| 2005/0039339 A1 | 2/2005 | Chen | |
| 2011/0154671 A1 | 6/2011 | Willetts | |

FOREIGN PATENT DOCUMENTS

| | | |
|---|---|---|
| EP | 1356888 | 10/2003 |
| EP | 1437189 | 7/2004 |
| JP | 04077201 A | 3/1992 |
| JP | 10263927 A | 10/1998 |

OTHER PUBLICATIONS

Pictures of Black + Decker Zip Saw believed to be publicly available and/or for sale more than one year prior to the filing of U.S. Appl. No. 61/487,520 from which the present application claims priority.

* cited by examiner

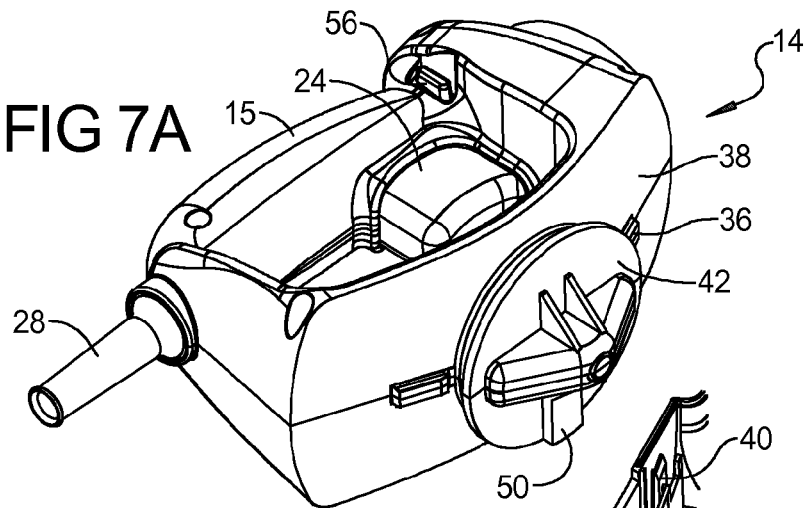
FIG 7A
FIG 7B
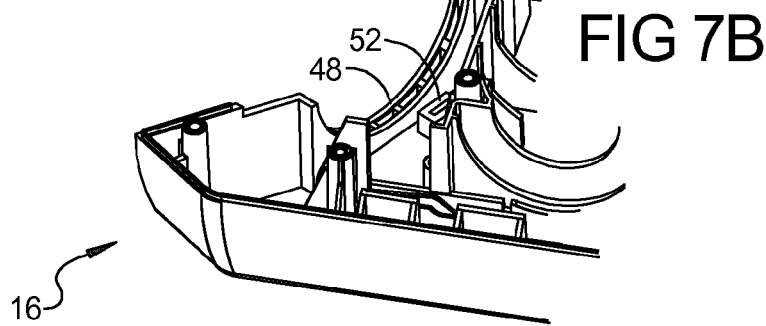
FIG 7C

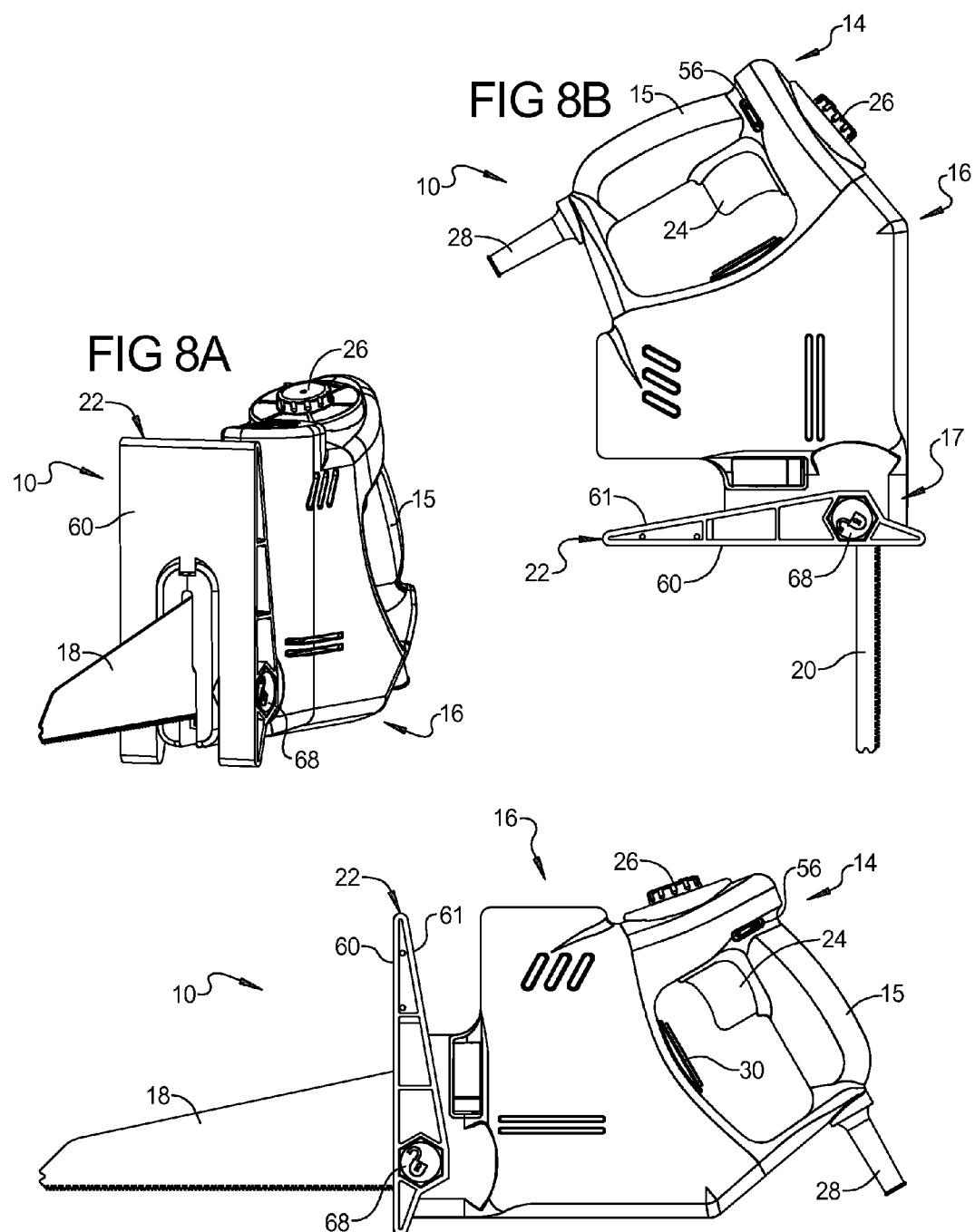

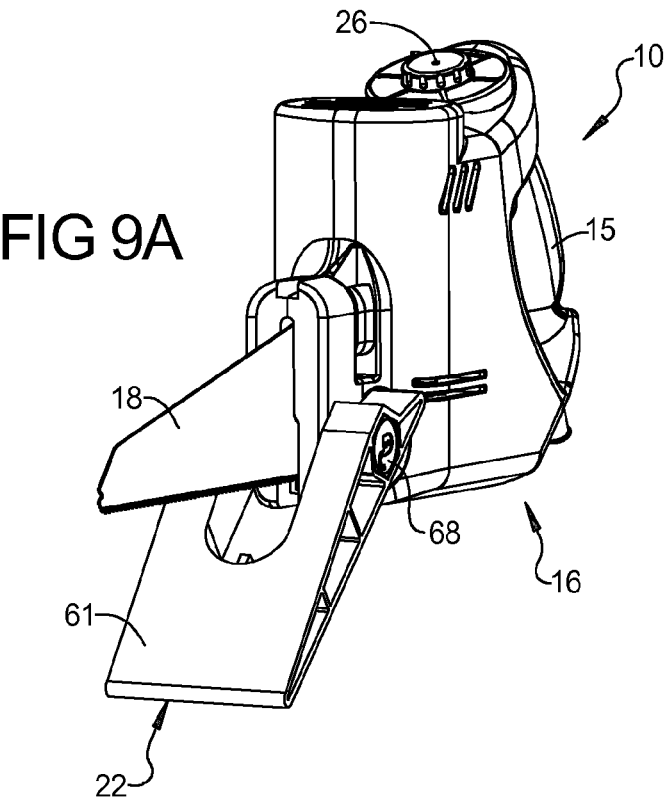
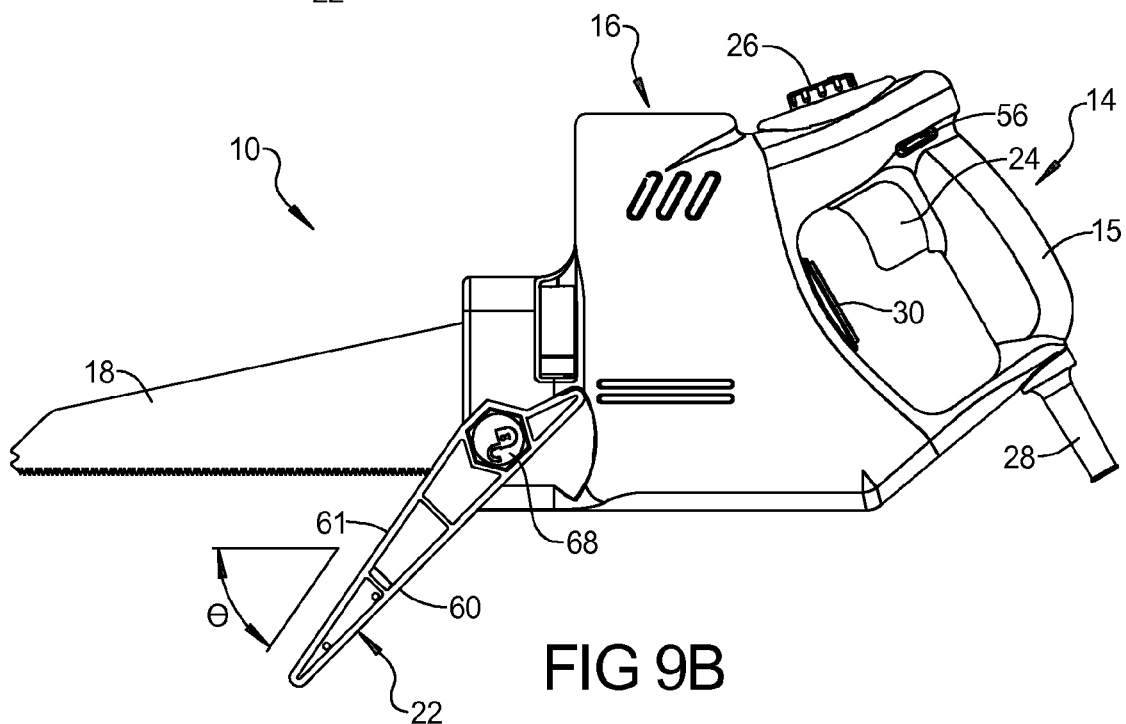

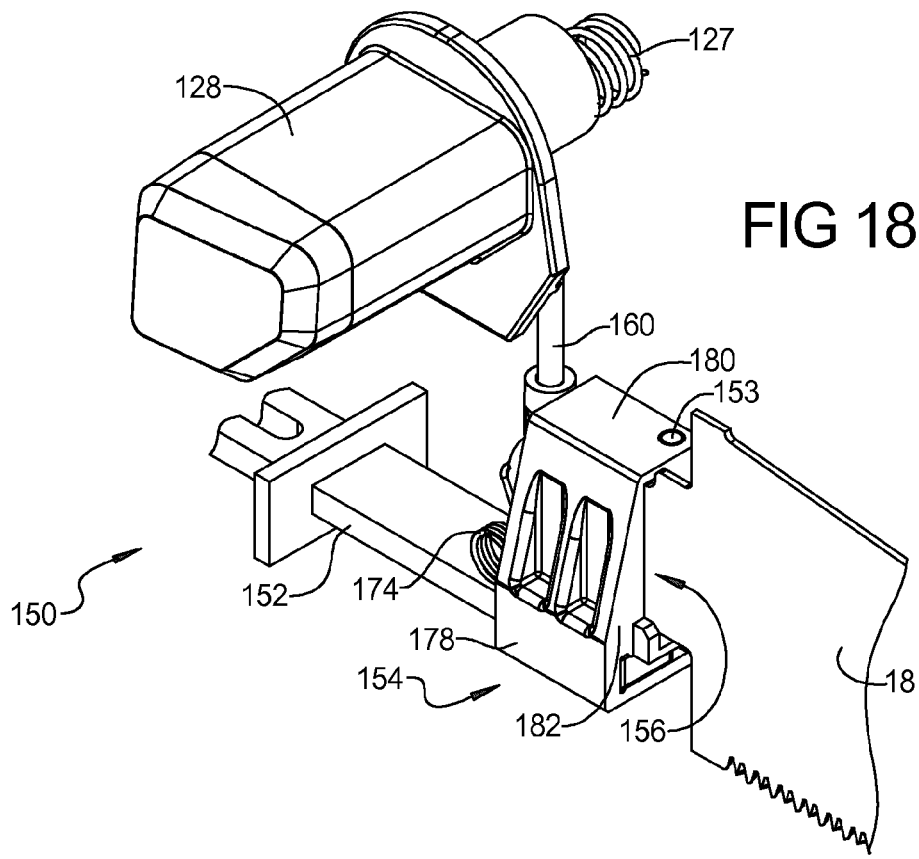
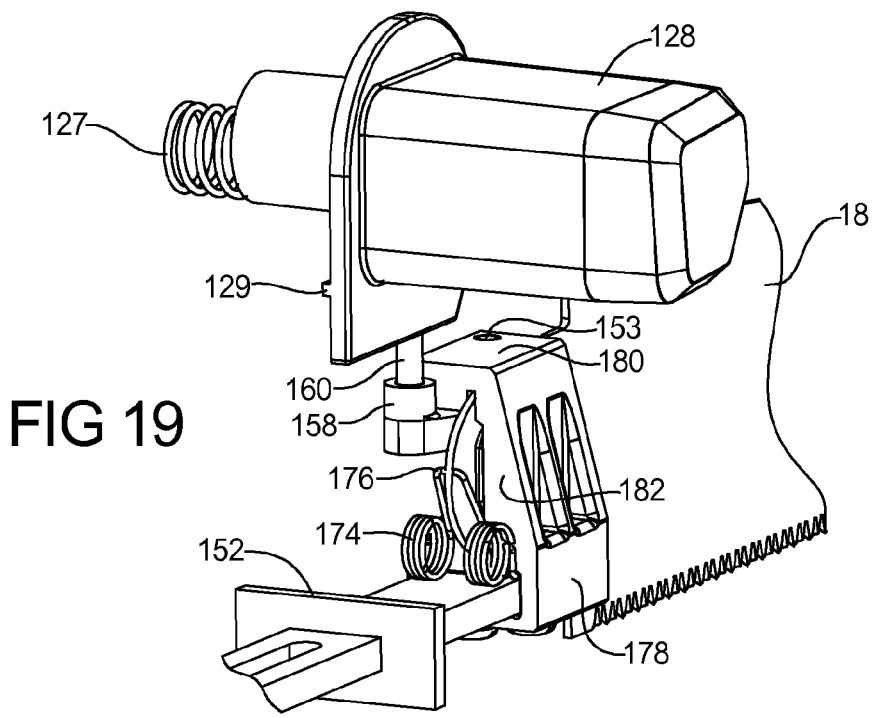

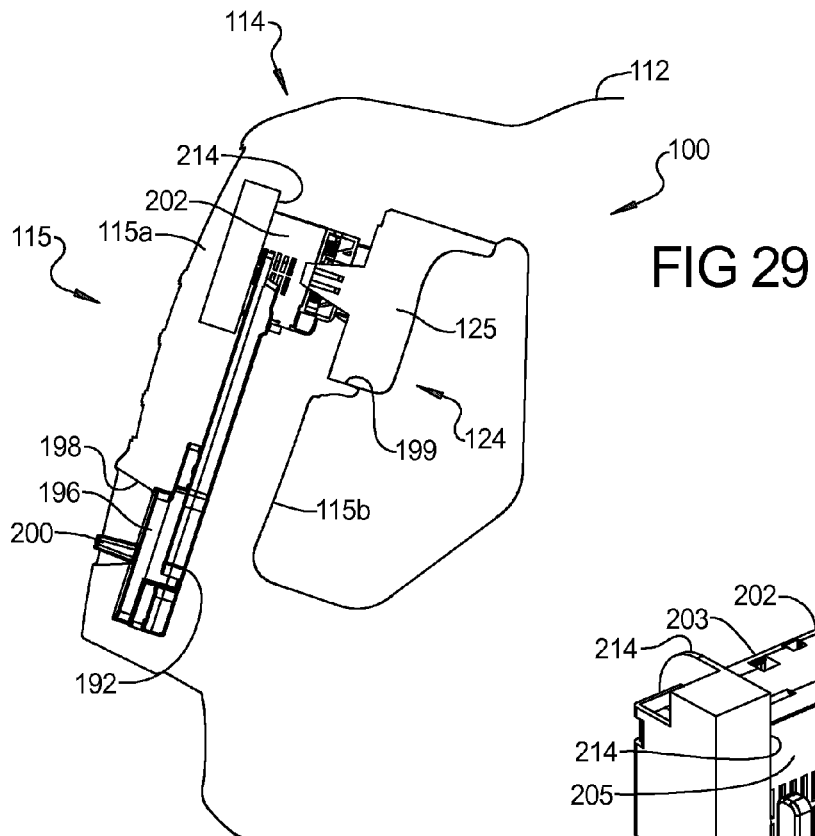
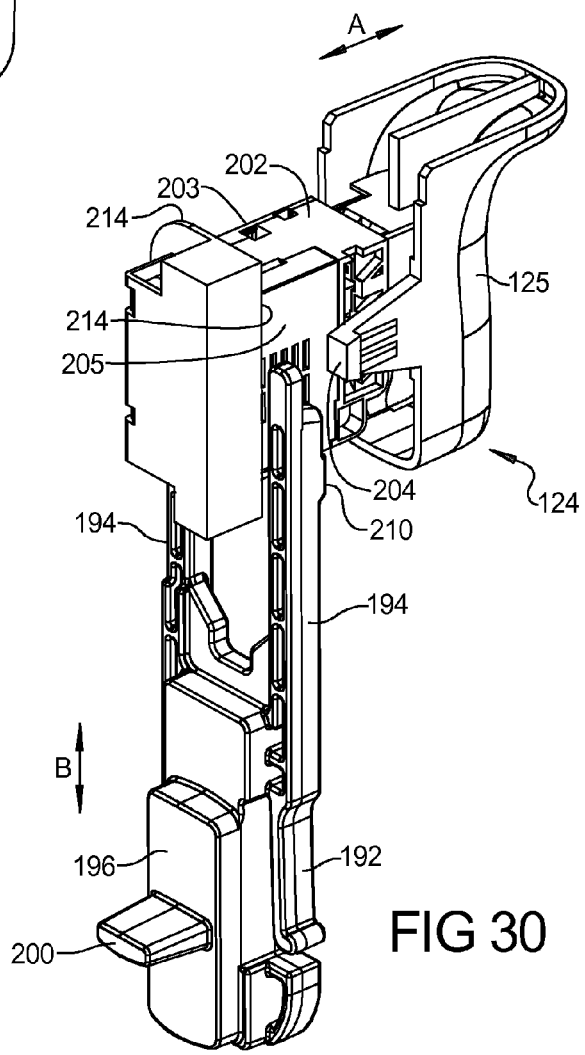

POWER SAW TOOL

CROSS-REFERENCE TO RELATED APPLICATIONS

This application claims the benefit of U.S. Provisional Application No. 61/487,520, filed on May 18, 2011. The entire disclosure of which is incorporated herein by reference.

FIELD

The present disclosure relates to a power saw tool.

BACKGROUND

This section provides background information related to the present disclosure which is not necessarily prior art.

Craftsman and builders use powered saws such as reciprocating saws and jig saws throughout the industry to perform various cutting operations. A conventional reciprocating saw or jig saw can generally include a housing having a motor, a drive mechanism for translating rotational motion of the motor into linear actuation of a carrier or drive shaft, and a saw blade releasably coupled to the drive shaft.

The reciprocating movements of the saw blade can exert forces on an object that is being cut. In some instances, a user can grip the object and hold it tightly with one hand while the reciprocating saw is held in the other hand in order to achieve an accurate cut. Such a scenario can present an inconvenient cutting experience. Furthermore, the cut can be inaccurate if the reciprocating saw blade is not steadily held in the same position with respect to the object, or if the speed of the saw blade is varied during use. While several different types of power saw tools area known in the art and achieve their intended purpose, they are not free from certain problems and inconveniences and there remains a need in the art for an improved power saw tool.

SUMMARY

This section provides a general summary of the disclosure, and is not a comprehensive disclosure of its full scope or all of its features.

The present disclosure provides a power saw tool including a housing, a motor disposed in the housing, and a reciprocating shaft coupled to the motor. A blade clamp assembly is mounted to the reciprocating shaft and adapted for gripping a saw blade. The blade clamp assembly includes a main body coupled to the reciprocating shaft and defining a channel for engaging the saw blade. A latch arm is pivotally attached to the main body and movable about a pivot axis. A latch release extends from the latch arm, and a locking catch extends from the latch arm and is adapted for retaining the saw blade within the channel. An actuator is provided, configured to selectively engage the latch release to permit removal of the saw blade from the blade clamp assembly.

In another aspect, the present disclosure provides a power saw tool including a motor and a reciprocating mechanism coupled to motor. The reciprocating mechanism is adapted to drive a reciprocating shaft coupled to a saw blade. A housing is provided including a body portion and a handle portion. The body portion is adapted to house the motor and reciprocating mechanism. The handle portion defines a handle grip adapted to house a trigger assembly. The trigger assembly includes a biased trigger button slidably movable in a first linear direction. Displacement of the trigger button controls a variable speed operation of the motor. The trigger button includes two stop members, each stop member extending from an opposing side of the trigger switch. A speed limiter is housed within the handle grip and is slidably movable with respect to the trigger assembly. The speed limiter includes a base portion including a slider button partially extending through the handle grip, and two spaced apart and parallel side posts extending from the base portion. The side posts are disposed adjacent to the opposing sides of the trigger assembly and cooperate with the respective stop members to delimit rearward travel of the trigger button, thereby restricting the speed of the motor.

In yet another aspect, the present disclosure provides a power saw tool including a motor and a reciprocating mechanism coupled to motor. The reciprocating mechanism is adapted to drive a reciprocating shaft coupled to a saw blade extending from the power saw tool. A housing is provided including a body portion and a handle portion. The body portion is adapted to house the motor and reciprocating mechanism. A shoe assembly is provided and includes a substantially U-shaped shoe. The shoe includes a base portion and two extending arms pivotally mounted to the body portion of the housing. The shoe defines at least one work surface and is adapted for rotational movement between a first position aligning the work surface substantially perpendicular to the saw blade, and a second position providing an acute angle between the shoe and the saw blade. The body portion of the housing defines a plurality of detents. At least one extending arm of the shoe defines a retaining feature adapted to matingly engage with the detents and to retain the shoe in the respective first and second positions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 7A-7C are perspective and partial sectional views of the power saw tool of FIG. 1 illustrating the connection of the handle portion to the body portion of the housing;

FIGS. 8A-8C illustrate perspective and plan views of various uses of the power saw tool with a shoe in a normal mode, substantially perpendicular to the saw blade;

FIG. 9A and 9B illustrate perspective and plan views of the power saw tool with the shoe in a branch pruning mode, with an acute angle between the shoe and the saw blade;

FIGS. 18 and 19 are partial perspective views of the blade clamp mechanism and actuator button;

FIG. 29 is a partial schematic view of a handle portion of the power saw tool, illustrating a trigger assembly including a speed limiter and a trigger switch;

FIG. 30 is a perspective view of the speed limiter in relation to the trigger switch when in an off position;

Corresponding reference numerals indicate corresponding parts throughout the several views of the drawings.

DETAILED DESCRIPTION

Figure 1:
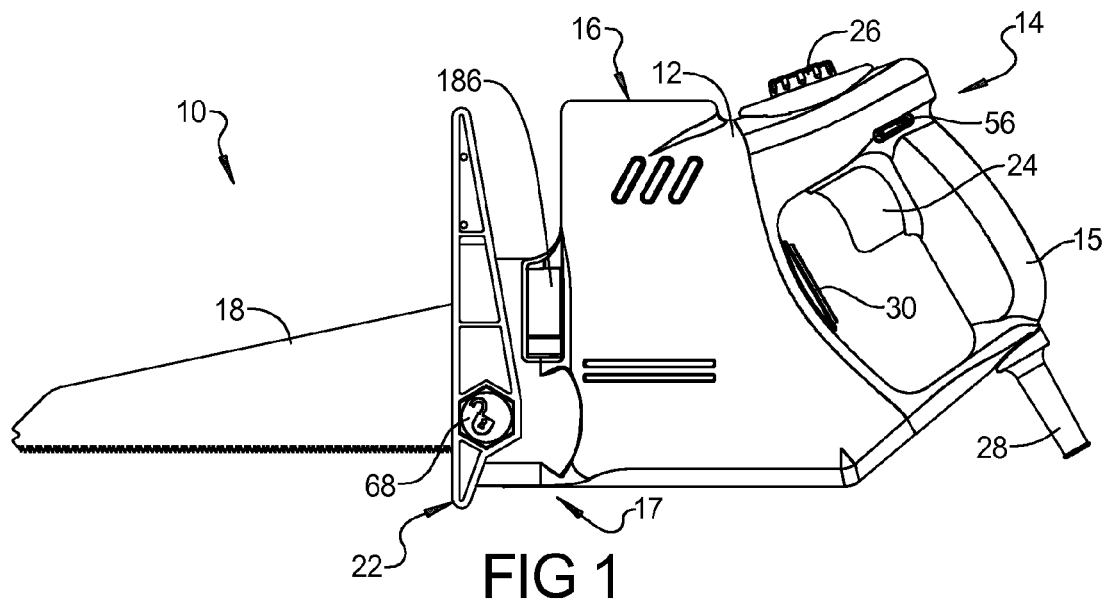
FIG. 1 is a side plan view of a power saw tool in a reciprocating or hand saw mode.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure provides a power saw tool. While the saw blade arrangement specifically shown throughout the drawings in various embodiments may be adapted for a reciprocating saw or a jig saw, those skilled in the art will appreciate that the teachings disclosed herein are not limited in scope, and can be adapted for use with any power tool incorporating one or more saw blade members, including reciprocating saws, jig saw, various surgical saws, culinary knives, etc.

The power saw tools of the present disclosure may typically include a housing or exterior shell to house a motor. The body of the power saw tool may be defined as having a longitudinal axis that is generally in-line with the cut direction of the saw blade disposed in the clamp device. The motor may be powered by an appropriate corded power source or by an appropriate rechargeable battery as is known in the art. Blade clamp devices for power saw tools useful herein generally fix the saw blade to a reciprocating type shaft of the power tool. The shaft may be driven by the motor through a gearbox or reciprocating mechanism known in the art to convert rotary motion of the motor into linear motion.

Figure 2:
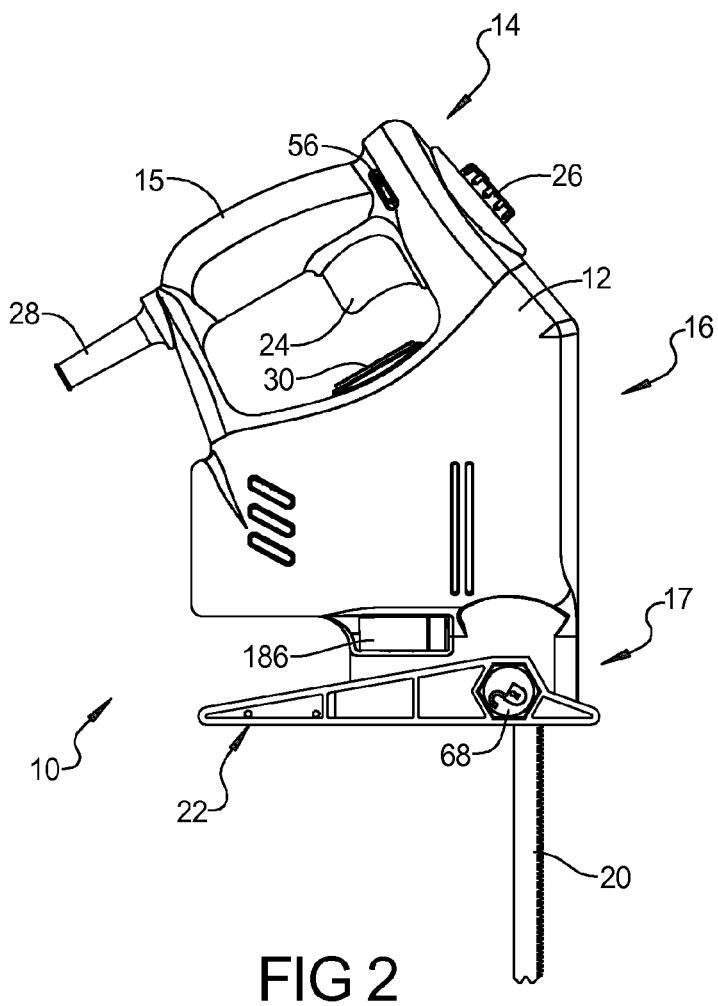
FIG. 2 is a side plan view of the power saw tool of FIG. 1 with the handle portion rotated 180 degrees and in a jig saw mode.

FIGS. 1 and 2 illustrate exemplary embodiments of a power saw tool 10 according to the present disclosure. FIG. 1 depicts the power saw tool 10 in what is referred to herein as a reciprocating or hand saw mode. FIG. 2 depicts the power saw tool in what is referred to herein as a jig saw mode. With reference to FIGS. 1 and 2, the housing 12 of the power saw tool 10 may be divided into a handle portion 14 and a body portion 16. Various portions of the housing 12 may be formed as clamshell type components connected with fasteners as is known in the art. A saw blade 18, 20 may be coupled at a forward end 17 of the body portion 16, and a shoe 22 may be provided near the interface of the saw blade 18, 20 with the end 17 of the body portion 16 to assist and help guide cutting.

As shown in FIGS. 1 and 2, the handle portion 14 of the housing 12 may include a handle grip 15 and a trigger 24. The handle portion 14 may also include a rotatable selector dial 26, or other selector-type device or switch, which allows a user to adjust various operating parameters of the power saw tool 10, such as the speed and/or the stroke length. The handle portion 14 may also include various control components internally housed, such as those required to operate the trigger 24 or adjust the speed and stroke length. The handle portion 14 may also connect to a corded power source 28 or battery (not shown). A motor, gearbox, and/or reciprocating mechanism may be contained in the body portion 16 of the housing 12. Additionally, a blade clamping device for clamping the hand saw blade 18 or jig saw blade 20 is contained in the body portion 16 or adjacent to the body portion 16, as discussed in more detail below.

FIG. 1 illustrates the handle portion 14 in a first position such that the power saw tool 10 is configured for use as a reciprocating or power hand saw. In various aspects, the handle portion 14 may be movable with respect to the body portion 16 so that it can be rotated or otherwise moved to a second position, as shown in FIG. 2. When the handle portion 14 is in the second position (FIG. 2), the power tool operates in a jig saw mode. The transformation between the reciprocating/power hand saw mode of FIG. 1 and the jig saw mode of FIG. 2 may be accomplished by rotation of the handle portion 14, moving from the first position to the second position so as to provide a different orientation between the handle portion 14 with respect to the blade 18, 20, while maintaining the same handle ergonomics. Additional adjustments may also be made between the reciprocating/hand saw mode of FIG. 1 and the jig saw mode of FIG. 2. For example, the reciprocating type saw blade 18 may be replaced with a jig saw type blade 20. The modes may also differ in the manner in which the saw blade operates, with features such as the length, path, and/or speed of the saw blade stroke being different for the different operating modes.

Figure 3A:
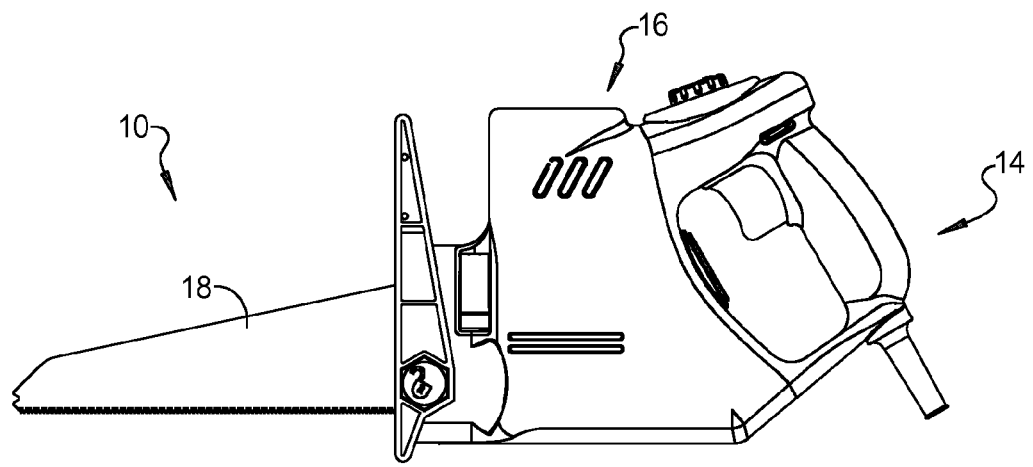
FIGS. 3A-3C illustrate the progressive rotation of the handle portion of the power saw tool from a first position to a second position.
Figure 3B:
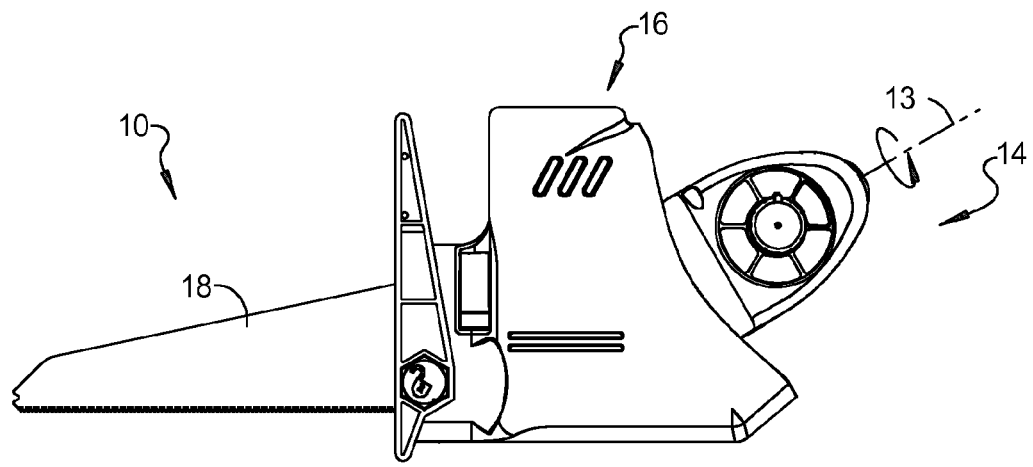
Figure 3C:
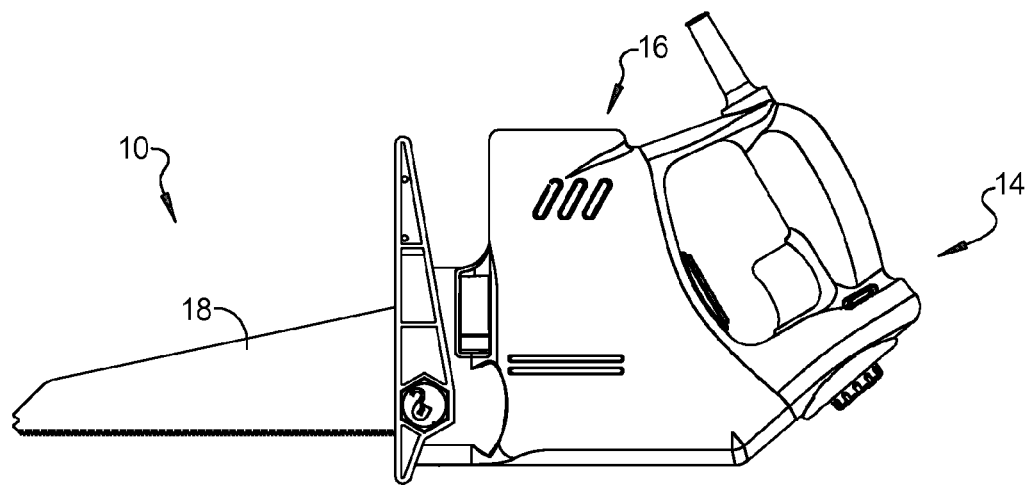

FIGS. 3A-3C illustrate the rotational movement of the handle portion 14 with respect to the body portion 16 from the first position (reciprocating saw/hand saw mode) to the second position (jig saw mode). As shown, the handle portion 14 is rotated a half-revolution, or 180 degrees about pivot axis 13, relative to the body portion 16, to move from the first position of FIG. 3A through various intermediate positions (FIG. 3B, shown with a 90 degree rotation) and to arrive at the second position of FIG. 3C. The handle portion 14 may then be rotated in the opposite direction to return to the first position.

The power saw tool 10 may include various safety features, such as a trigger lockout and a handle release latch mechanism that either locks the handle portion 14 in place or allows it to move relative to the body portion 16.

Figure 4A:
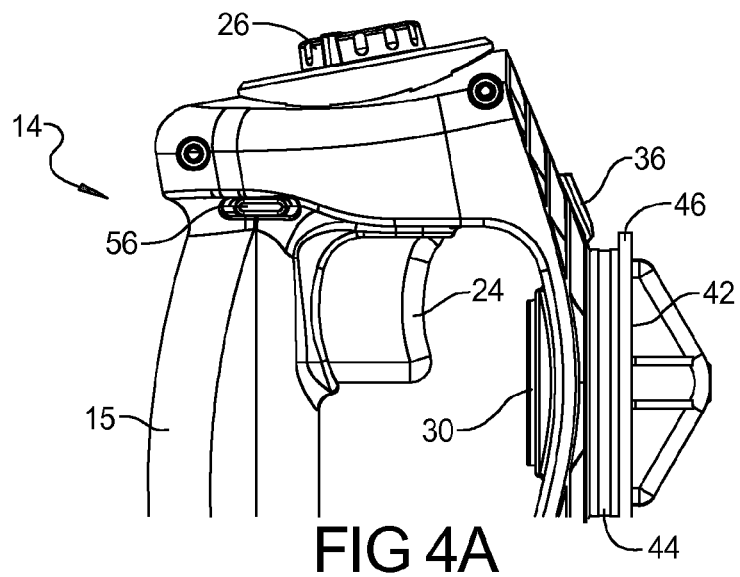
FIGS. 4A-4C are partial perspective and partial sectional views of the handle portion of the power saw tool of FIG. 1 illustrating a handle latch mechanism.
Figure 4B:
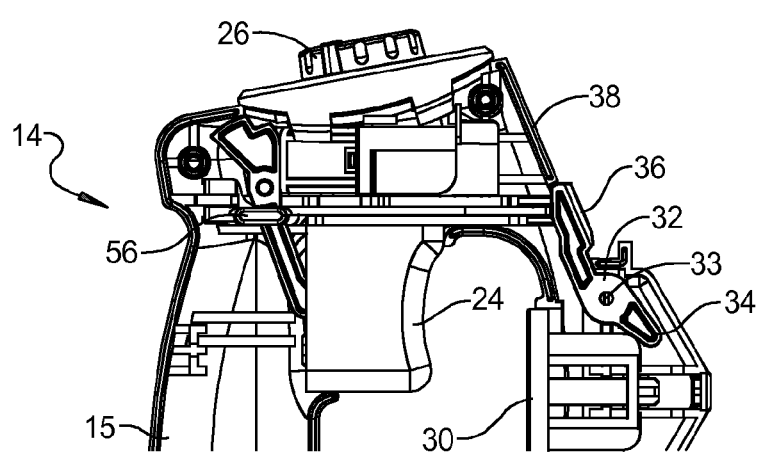
Figure 4C:
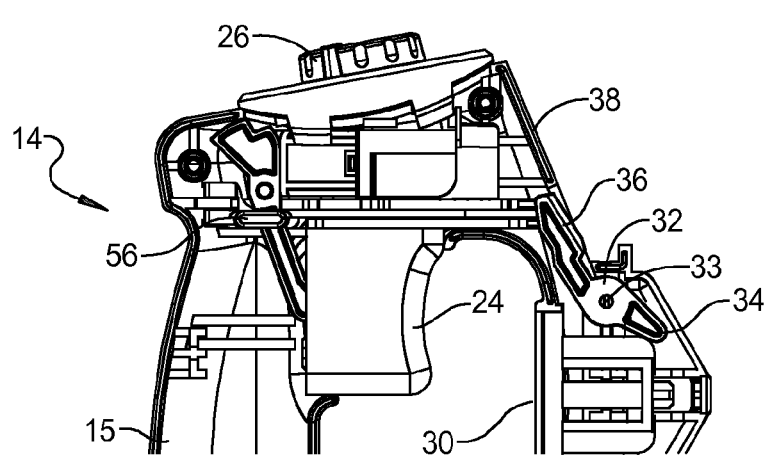
Figure 5:
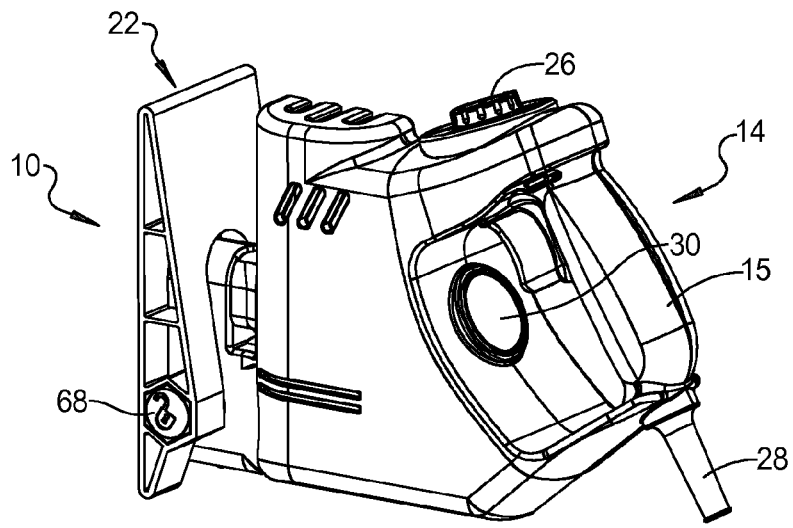
FIG. 5 is a rear side perspective view of the power saw tool of FIG. 1 (without a saw blade) illustrating a handle release button of the handle latch mechanism.
Figure 6A:
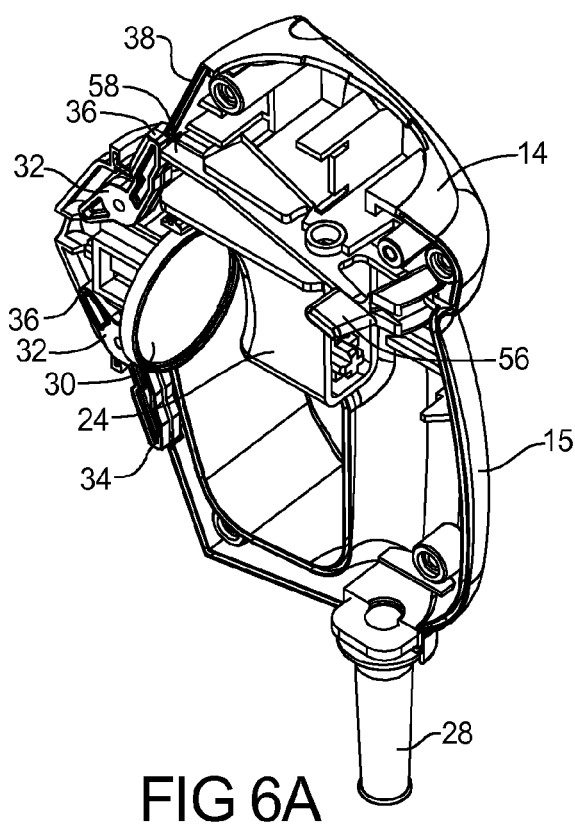
FIGS. 6A-6C are perspective and sectional views of the handle portion of the power saw tool of FIG. 1 illustrating a trigger lockout mechanism.
Figure 6B:
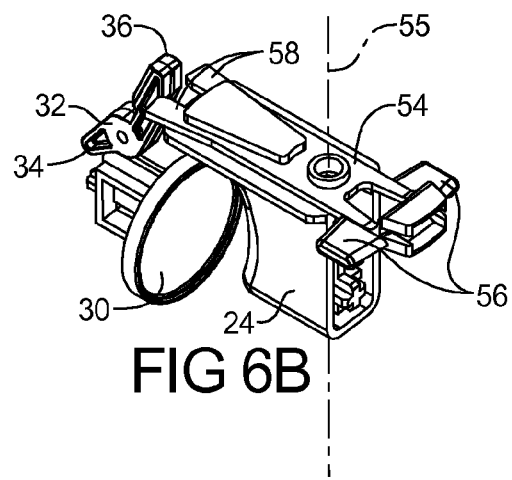
Figure 6C:
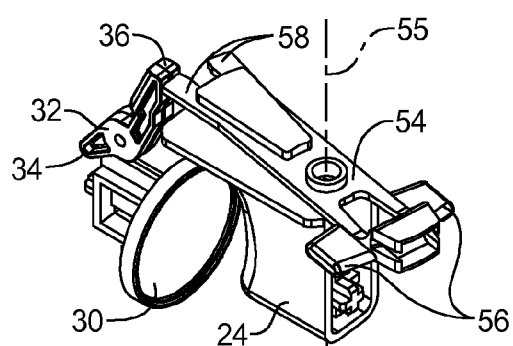

One exemplary embodiment of the trigger lockout and handle release latch mechanism will be described in more detail with specific reference to FIGS. 4-7. FIGS. 4A-4C are partial perspective and partial sectional views of the handle portion 14 of the power saw tool 10 illustrating a handle release latch mechanism. FIG. 5 is a rear side perspective view of the power saw tool 10 illustrating a handle release button of the handle release latch mechanism. FIGS. 6A-6C are perspective and partial sectional views of the handle portion 14 illustrating a trigger lockout mechanism. FIGS. 7A-7C are partial perspective sectional views of the power saw tool 10 illustrating the connection of the handle portion 14 (FIG. 7A) to the body portion 16 (FIG. 7B) of the housing 12.

The lockout and release latch mechanism cooperate to ensure at least two safety features. First, the handle portion 14 should not be rotated relative to the body portion 16 when the power saw tool 10 is operating. Second, the power saw tool 10 should not be operated while the handle portion 14 is being rotated. As best shown in FIG. 5, the power saw tool 10 has a handle lock release button 30. The handle lock release button 30 may generally be urged towards its extended state in which it locks the handle portion 14 in place with respect to the body portion 16. As shown in FIGS. 4A-4C, the lock release button 30 can be coupled to or disposed adjacent to a latch 32. The latch 32 has a first end 34, which is engaged by the lock release button 30, and a second end 36 opposite the first end 34. The second end 36 interacts with the body portion 16 in order to lock the handle portion 14 and the body portion 16 in a fixed relative position.

FIG. 4B shows the latch 32 in a locked position. In this position, the lock release button 30 is in its extended (locked position). The second end 36 of the latch 32 extends a distance beyond the outer surface 38 of the handle portion 14 of the housing so that it engages with a corresponding recess portion or cut-out 40 of the body portion 16 (FIG. 7B) and prevents relative movement of the handle portion 14 with respect to the body portion 16. FIG. 4C shows the latch 32 in an unlocked position. In FIG. 4C, the lock release button 30 has been inwardly depressed by a user into an unlocked state. In the unlocked state, the lock release button 30 pushes on the first end 34 of the latch 32 (or pushes the first end 34 of the latch 32 to a greater extent). The latch 32 then rotates around its central pivot axis 33 and the second end is moved towards the interior of the handle portion 14 and out of engagement with the body portion 16. Accordingly, the handle portion 14 is then free to rotate from the first position to the second position (hand saw mode to jig saw mode) or from the second position back to the first position (jig saw mode to the handsaw mode). It is noted that the handle portion 14 and the body portion 16 are still engaged with one another in the unlocked position.

With particular reference to FIGS. 7A-7C, the handle portion 14 may be provided with an engaging portion 42 that engages with the body portion 16. As shown in FIG. 7A, the engaging portion 42 may be provided with an extending portion 44 and a lip 46. With reference to FIG. 7B, the body portion 16 is provided with an engagement rib 48. As shown in FIG. 7C, the lip 46 fits over the engagement rib 48 to secure the handle portion 14 and the body portion 16 to one another in an axial direction. As shown in FIG. 7C, the second end 36 of the latch 32 may engage the cut-out 40 in the body portion 16 to secure the handle portion 14 and body portion 16 in a fixed rotational manner when it is in a locked position. Additionally, as shown in FIG. 7A, the handle portion 14 may include a rotation stop tab 50 and the body portion 16 may include a corresponding rotation stop tab 52. These rotation stop tabs 50, 52 interact to prevent full 360 degree rotation of the handle portion 14. For example, the handle portion 14 can only rotate until the tabs 50, 52 engage one another. Once engaged, the handle portion 14 can only be rotated in the reverse direction.

FIGS. 6A-6C illustrate an exemplary trigger lock 54 disposed in the handle portion 14 of the housing 12 and movable on a pivot axis 55. The trigger lock 54 can be moved by engaging either of two buttons 56, which extend a distance out from the handle housing. When the trigger lock 54 is in a central position, as shown in FIG. 6B, the lock release button 30 can be pushed and the latch 32 can be moved. When the lock release button is pushed, the second end 36 of the latch 32 is disposed between the locking protrusions 58 of the trigger lock 54, preventing movement of the trigger lock 54. However, when the trigger lock 54 is pushed to one of the sides, as shown in FIGS. 6A and 6C, a locking protrusion 58 of the trigger lock 54 blocks the second end 36 of the latch 32 so that it cannot be moved. Thus, the latch 32 remains in a locked position where it prevents the relative movement of the handle portion 14 and the body portion 16. Because the latch 32 cannot be moved when blocked by a locking protrusion 58 of the trigger lock 54, the handle lock release button 30 also cannot be moved in this state.

The trigger lock 54 is also associated with the trigger 24 such that it prevents activation/depression of the trigger 24 when the trigger lock 54 is in the central position as shown in FIG. 6C. In other words, the trigger 24 can only be activated when trigger lock 54 is moved to one side. The trigger lock 54 can only be moved to one side when the lock release button is not engaged, i.e., when the handle portion 14 is prevented from rotation.

Figure 11A:
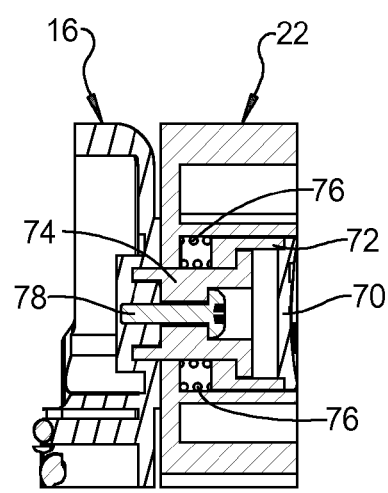
FIG. 11A is a cross-sectional view illustrating details of the pivot lock articulation assembly.
Figure 11B:
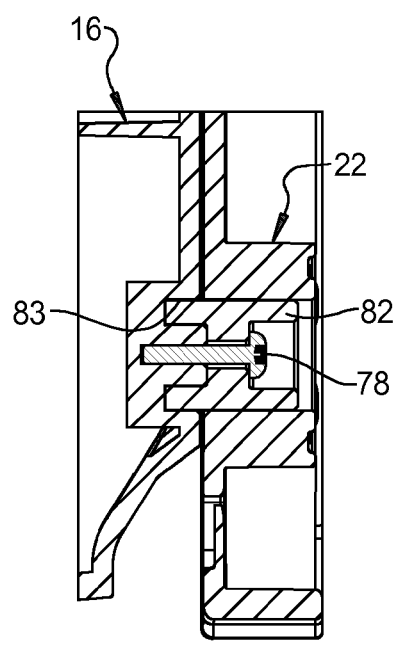
FIG. 11B is a cross-sectional view of an alternate embodiment using a pivot post to rotatably couple the shoe to the housing.
Figure 12:
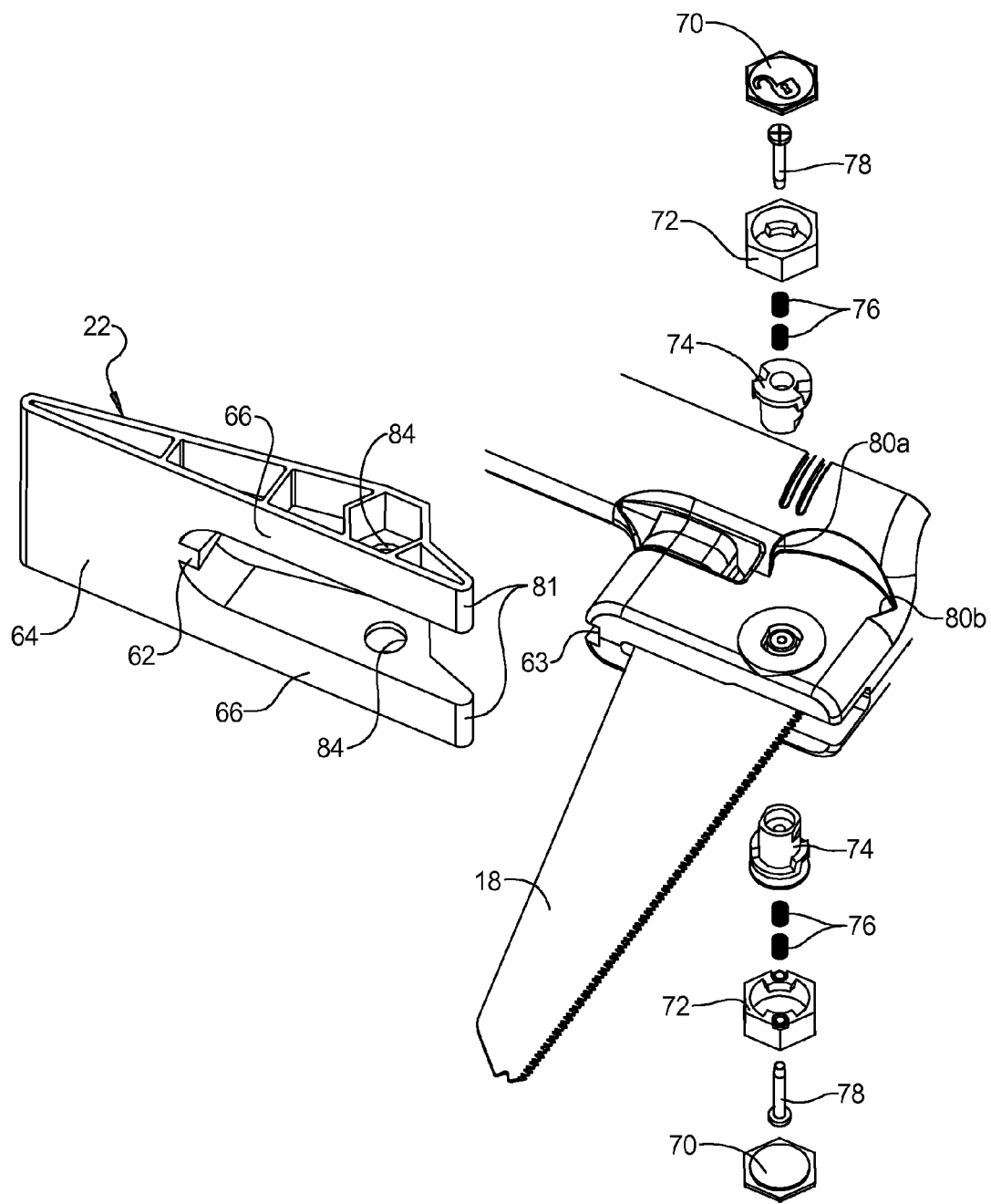
FIG. 12 is an exploded perspective view of a portion of the power saw tool including the pivoting shoe assembly of FIG. 10.

With reference to FIGS. 8-12, the power saw tool 10 may be provided with an adjustable pivoting shoe assembly that includes a shoe 22 that can be moved between two or more positions. FIGS. 8A, 8B, and 8C illustrate perspective and plan views of various uses of the power saw tool 10 with a shoe in a normal mode, or a saw shoe mode. FIGS. 9A and 9B illustrate perspective and plan views of the power saw tool 10 having the shoe 22 disposed in a branch mode, with an acute angle between the shoe 22 and the blade 18. In the first position (the saw shoe mode), the shoe 22 provides support in a manner similar to a traditional jig saw or reciprocating saw. In the first position (FIGS. 8A, 8B, and 8C), a first substantially flat work surface 60 of the shoe 22 may slide across a surface of a work piece (not shown) being cut, while the blade 18, 20 extends through the shoe 22 and into the work piece. The shoe 22 essentially provides a normal force against the work piece because the blade 18, 20 tends to pull the work piece toward the saw 10 with each stroke. The shoe 22 may also maintain the desired angle (normal or angled bevel) between the blade 18, 20 and the work piece. The shoe 22 may feature a throat plate to prevent tear-out in the work piece. The shoe 22 may also be notched at the front to allow the user a clear line-of-sight to the blade 18. As best shown in FIG. 12, the shoe 22 may include a protrusion 62 that may cooperate with a corresponding notch 63 defined in the body housing for alignment when in the first position.

In the second position (FIGS. 9A, 9B, branch mode), the shoe 22 may act as a support to steady a branch for pruning. The shoe 22 may be provided with a second work surface 61 designed to bear against the branch (or other work piece, such as a pipe) and there is an acute angle θ between the work surface 61 and the cutting edge of the blade 18. In use, the power saw tool 10 may be maneuvered so that a branch, for example, is positioned between the work surface 61 and the blade 18. As the teeth of the blade 18 cut into the branch, they draw the branch closer to the power saw tool 10 and up the ramp of the surface 61, which ensures that the branch remains in contact with the blade 18.

Figure 10:
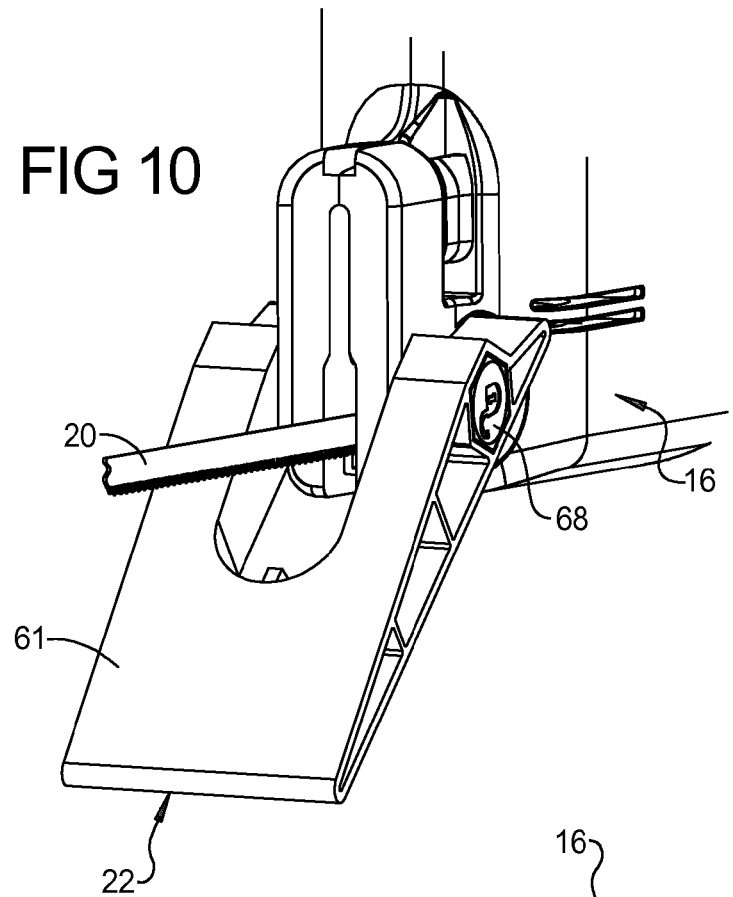
FIG. 10 illustrates a portion of the power saw tool housing near the saw blade and includes a pivoting shoe assembly with a pivot lock articulation assembly for enabling selective pivoting movement of the shoe with respect to the housing.

FIG. 10 illustrates part of the body portion 16 near the saw blade 20 as well as the pivoting shoe assembly with a pivot axis 68 enabling pivoting movement of the shoe 22 with respect to the body portion 16. FIG. 12 is an exploded perspective view of part of the body portion 16 including the pivoting shoe assembly. The shoe 22 may be substantially U-shaped, including a base portion 64 and two extending arms 66, each pivotally mounted to the body portion 16 of the housing 12. Specifically, in the exemplary embodiment shown, the shoe 22 is rotatable about a pivot 68. In its default state, the shoe 22 may be locked in place in either the first or second position. The shoe 22 may be temporarily unlocked to allow it to rotate about the pivot 68. For this purpose, the pivot 68 may include a pivot articulation lock mechanism, as provided in FIG. 12.

The pivot articulation lock assembly can include a pair of buttons 70, first castellated parts 72, second castellated parts 74, bias springs 76, and pins 78. FIG. 11A is a partial cross-sectional view illustrating the details of one embodiment of the pivot articulation lock assembly. The first castellated part 72 cannot rotate relative to the shoe 22, but can move along the axis of rotation. The second castellated part 74 may be fixed to the body portion 16. The springs 76 bias the first castellated part 72 so that the respective teeth of both of the castellated parts 72, 74 are engaged, preventing relative rotation of the two castellated parts 72, 74, and by extension, of the shoe 22 and the body portion 16 of the housing. When the teeth of the castellated parts 72, 74 are disengaged by pushing the first castellated part 72 inward, compressing the bias springs 76, the shoe 22 may be rotated relative to the body portion 16 of the housing. Stops 80a, 80b may be provided on the body portion 16 that limit the rotational travel of the shoe 22 in either direction by contacting an edge 81 of the shoe 22.

Alternatively, the shoe 22 could have features that lock into sockets, dovetails, or other such features provided on the body portion 16 of the housing to lock it in place. FIG. 11B is a cross-sectional view illustrating an alternate embodiment using a pivot post 82 secured to each side of the body portion 16 with a fastener 78. The pivot post 82 may be castellated and the body portion 16 may be provided with a cooperating bore 83 with projections to matingly engage with the pivot post 82 to prevent rotational movement there between. Each arm 66 of the shoe 22 can be provided with a pivot bore 84 that cooperates with a respective pivot post 82 to rotatably couple the shoe 22 to the body portion 16.

Figure 13A:
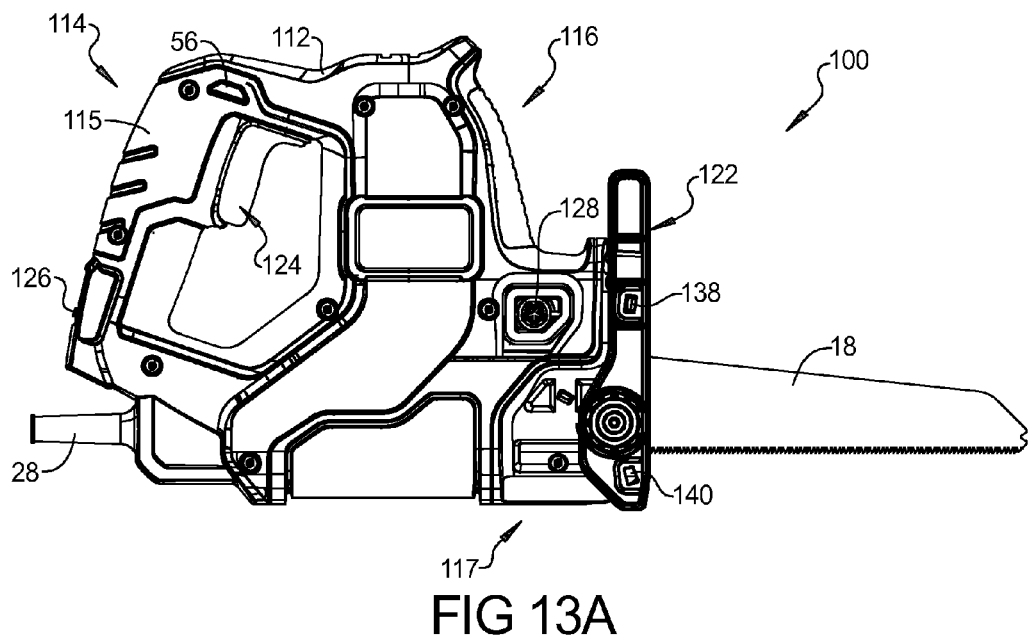
FIG. 13A is a side plan view of another power saw tool in accordance with the teachings of the present disclosure.
Figure 13B:
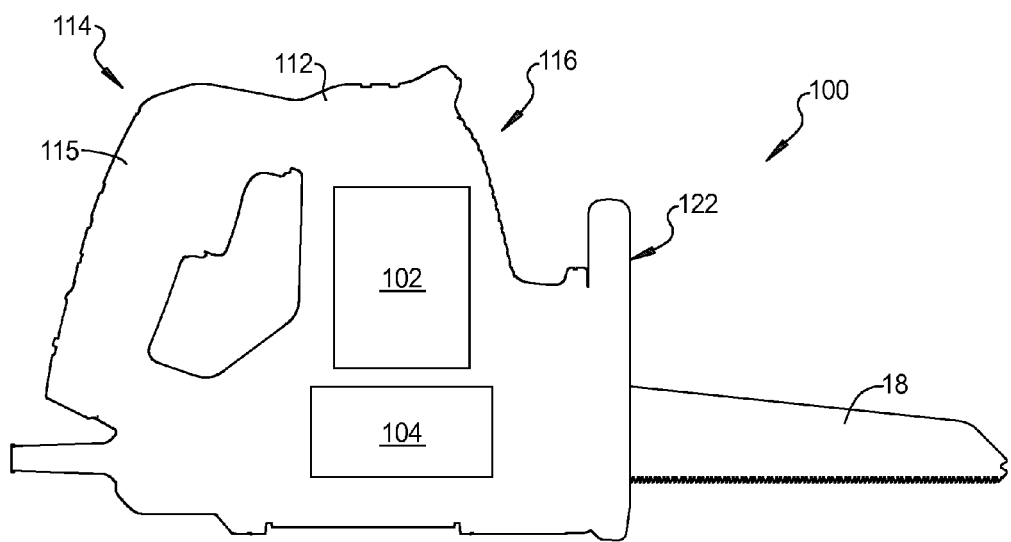
FIG. 13B is a partial schematic view of the power saw tool shown in FIG. 13A.

FIG. 13A is a side plan view of another power saw tool 100 in accordance with the teachings of the present disclosure. FIG. 13B is a partial schematic view of FIG. 13A showing an outline of the housing 112 including a handle portion 114 with a handle grip 115 and trigger switch 124, as well as a body portion 116. As shown in this embodiment, the handle portion 114 of the power saw tool 100 is not rotatable with respect to the body portion 116.

A saw blade 18 is coupled at an end 117 of the body portion 116 and a shoe 122 is provided near the interface of the saw blade 18 with the end 117 of the body portion 116 to assist and help guide cutting. The handle portion 114 may also include at least one slide control feature 126, which allows a user to adjust various operating parameters of the power saw tool 100, such as the speed and/or the stroke length. The handle portion 114 may also include various control components internally, such as those required to operate the trigger switch 124 or adjust the speed and stroke length. The handle portion 114 may also connect to a corded power source 28 or battery (not shown). A motor 102, reciprocating mechanism 104, and/or gearbox may be contained within the body portion 116 of the housing 112. A blade release actuator button 128 is provided as part of the housing, with a portion extending therefrom, accessible by a user to enable selective release of the saw blade 18.

Figure 14:
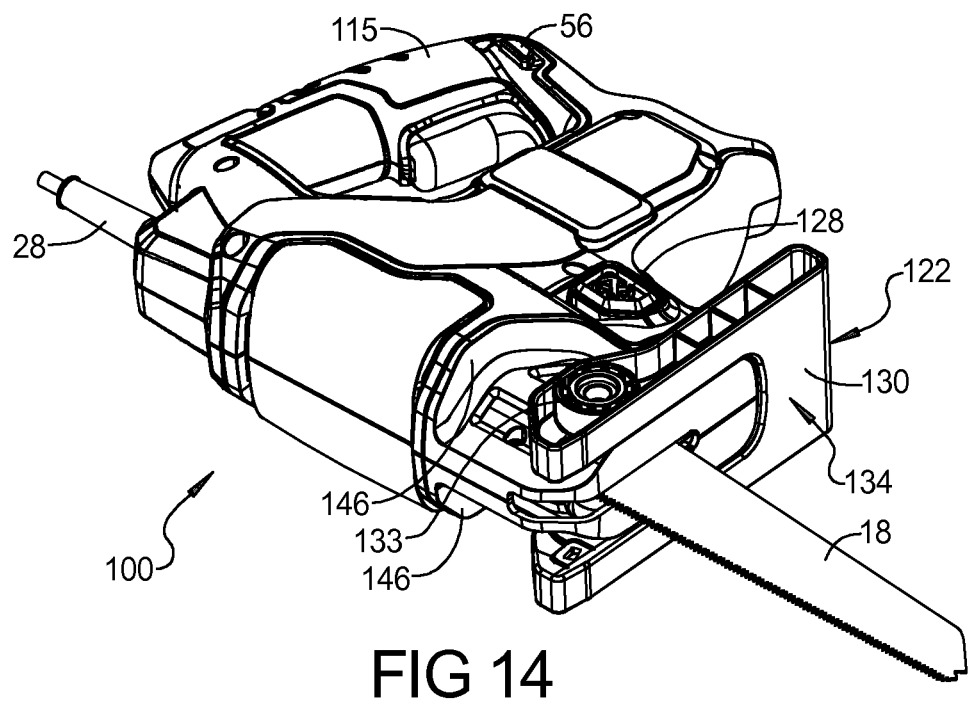
FIG. 14 is a bottom-side perspective view of the power saw tool of FIG. 13A.
Figure 15:
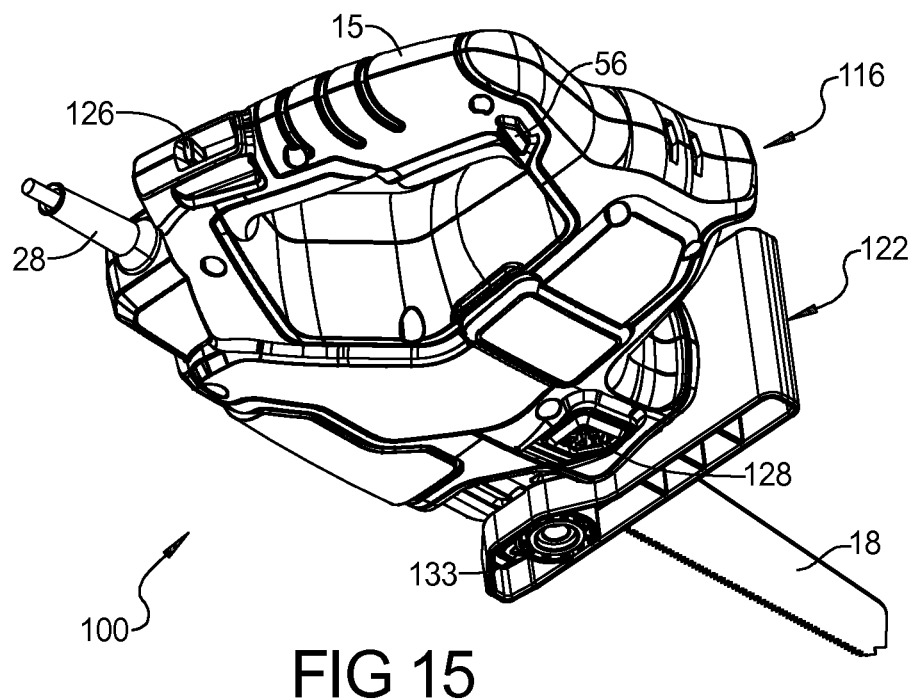
FIG. 15 is a top-side perspective view of the power saw tool of FIG. 13A.

FIG. 14 is a bottom-side perspective view of the power saw tool 100 of FIG. 13A; FIG. 15 is a top-side perspective view of the power saw tool of FIG. 13A. As shown in FIG. 14, a shoe assembly is provided with a substantially U-shaped shoe 122 that includes a base portion 130 and two extending arms 132 pivotally mounted to the body portion 116 of the housing 112. The extending arms 132 may define respective pivot bores 133 and the shoe 122 may be coupled to the body portion 116 using a pivot articulation assembly as discussed above with reference to FIGS. 11A, 11B, and 12. Similar to the embodiments disclosed with respect to power saw tool 10 and shoe 22, shoe 122 likewise may define a first work surface 134 and a second work surface 136. The shoe 122 may be coupled to a front end 177 of the body portion 116 and may adapted for rotational movement between at least a first position aligning the first work surface 134 substantially perpendicular to the saw blade 18, and a second position, providing an acute angle between the shoe 122 and the saw blade 18.

Figure 16:
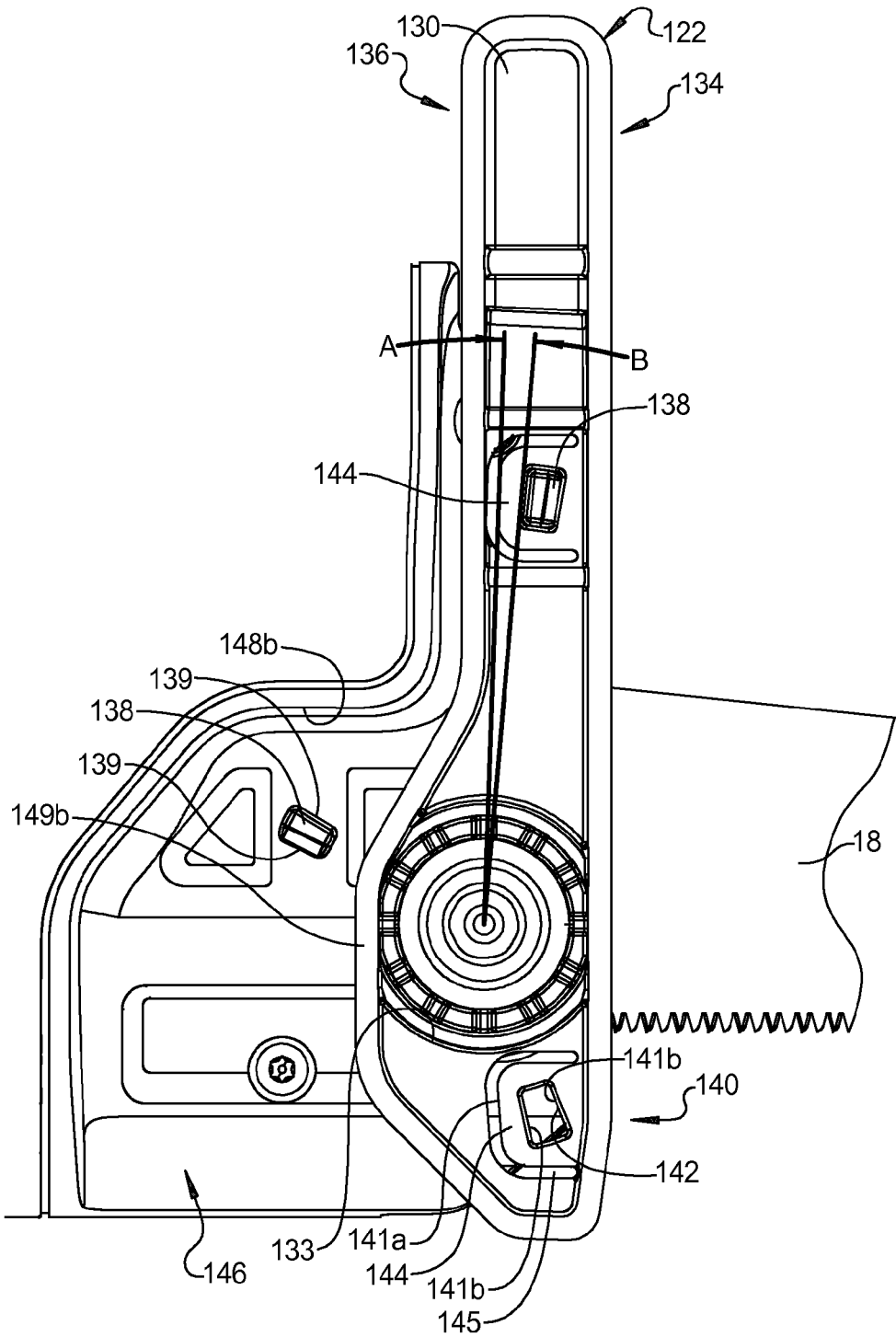
FIG. 16 is a partial side plan view of the power saw tool of FIG. 13A, illustrating the shoe held in a normal mode, substantially perpendicular to the saw blade.
Figure 17:
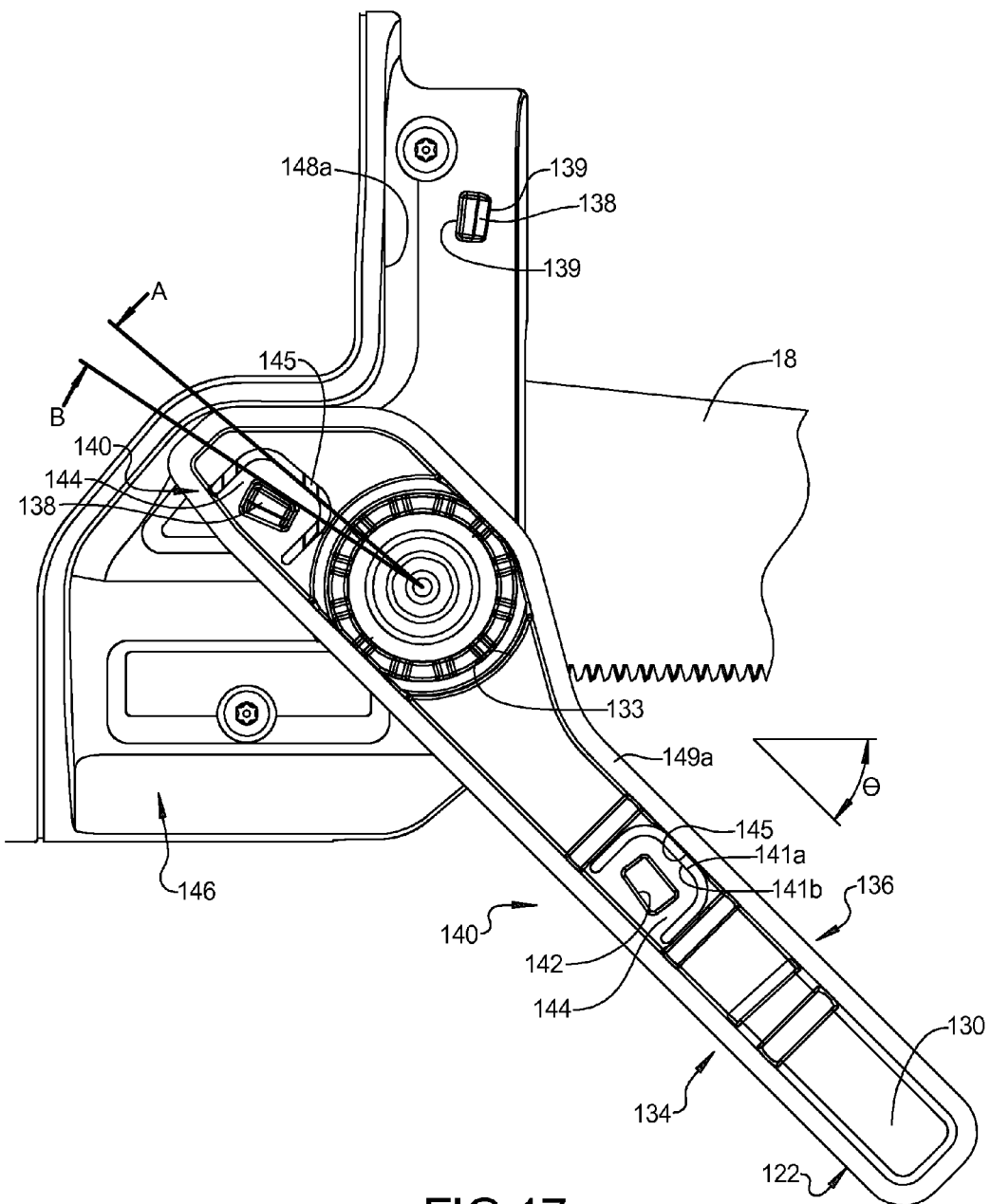
FIG. 17 is a partial side plan view of the power saw tool of FIG. 13A, illustrating the shoe held in a branch pruning mode, with an acute angle between the shoe and the saw blade.

FIG. 16 is a partial side plan view illustrating the shoe 122 held in the first position, or normal mode, with a work surface 134 substantially perpendicular to the saw blade. FIG. 17 is a partial side plan view illustrating the shoe 122 held in the second position, or branch pruning mode, with an acute angle θ between the second work surface 136 of the shoe 122 and the cutting edge of the saw blade 18.

As shown in FIGS. 16 and 17, the body portion 116 may define a plurality of detent features 138, and at least one or both of the extending shoe arms 132 may define one or more retaining features 140 adapted to matingly engage with the detent features 138 and to retain the shoe 122 in the respective first and second positions. As shown, the retaining feature 140 may define an aperture or retaining slot 142 shaped to correspond with the detent features 138 and may be surrounded by a substantially C-shaped flexible support member 144 at least partially separated from the remainder of the arm 132 by an aperture 145 defined therein. The flexible support member 144 may be designed to flex or bend while travelling over the detent features 138. The detent features 138 may be provided with a curved shape or ramp surface allowing the retaining feature 140 to pass over the detent features 138 during movement between the first and second positions. The body portion 116 of the housing may also define a recessed area 146 proximate the shoe 122 and saw blade 18 that permits limited rotational movement of the shoe 122 with respect to the body portion 116. The recessed area 146 may define one or more stops 148a, 148b that contact an edge 149a, 149b of the shoe 122, thus limiting rotational travel of the shoe 122 in either direction.

In various aspects, a leading edge of the retaining feature 140, and by way of example, the leading edge 141a and inner edges 141b of the C-shaped flexible support members 144, as well as the mating leading edge 139 of the detent features 138 may each be linear and radially aligned with one another (i.e., not parallel) from a common center of rotation. With reference to FIGS. 16 and 17, Lines A and B both radially extend from the center point of the pivot bore 133, and thus are radially aligned with the center of rotation of the shoe 122. Line A represents the linear outer edge 141a of the flexible support member 144. Line B represents the linear inner edges 141b of the flexible support member and the linear edge 139 of the detent feature. In this regard, the leading and inner edges 141a, 141b of the C-shaped flexible support member 144 make contact along the entire length of the respective edges 139 of the detent feature. This alignment may assist in distributing any applied stress evenly along the retaining feature 140, allowing the C-shaped flexible support member 144 to be deflected evenly across the retaining feature 140 and minimizing any concentration of stress at any particular point, for example, at a corner.

FIGS. 18-28 illustrate various aspects of an exemplary blade clamp assembly 150 disposed within the body portion 116 of the housing 112 for receiving, retaining, and selectively ejecting the saw blade 18. In various aspects, the blade clamp assembly preferably only requires only a single step of inserting the blade 18 into a channel to install the saw blade 18, and a single step of depressing the actuator button 128 for the saw blade 18 to be ejected therefrom.

Figure 20:
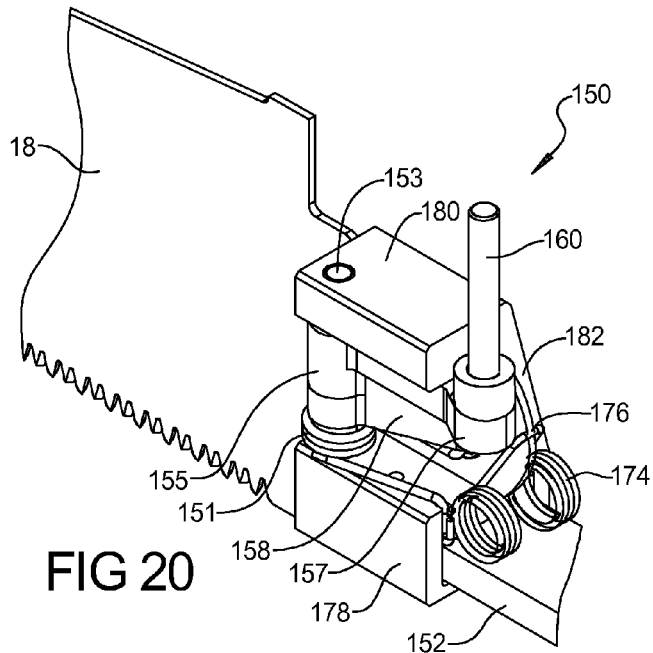
FIG. 20 is a partial perspective view illustrating various details of the blade clamp mechanism.

FIGS. 18-21 are partial perspective views of the blade clamp assembly 150 mechanism mounted to a reciprocating shaft 152. The reciprocating shaft 152 may be coupled to the reciprocating mechanism 104 on one end and adapted for gripping a saw blade 18 on the other end. As shown, the blade clamp assembly 150 may include a main body 154 coupled to the reciprocating shaft 152 and defining a channel 156 for accepting and retaining the saw blade 18. Once inserted, the blade clamp assembly 150 retains the saw blade 18 in the channel 156. A latch arm 158 may be pivotally attached to the main body 154 and movable about a pivot axis 159. A latch release may be coupled to the latch arm 158, a non-limiting example being an extending latch arm release pin 160 mounted within a bore 161 of the latch arm 158. The latch arm release pin 160 may be disposed offset from, and parallel to, the pivot axis 159, extending substantially perpendicular to the latch arm 158. As shown in FIG. 20, the latch arm 158 may include a first end 155 pivotally attached to the main body 154 via pivot pin 153 and a second end 157 opposite the first end 155 and coupled to the latch release pin 160.

Figure 21:
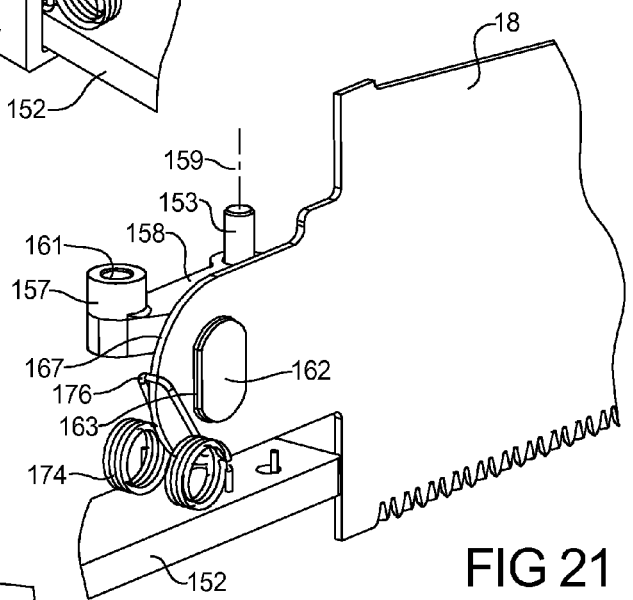
FIG. 21 is a partial perspective view illustrating various details of the blade clamp latch arm and locking catch.

With reference to FIG. 21, the latch arm 158 may include a locking catch 162 extending therefrom and adapted to retain the saw blade 18 within the channel 156. In various aspects, the locking catch 162 may be ramped and protrudes from the latch arm 158 at an angle forming an extending step portion 163 so that as the saw blade 18 is inserted into the channel 156, the saw blade 18 bears against ramped locking catch 162, deflecting the locking catch 162 out of the way of the saw blade 18. The locking catch 162 may be shaped and positioned on the latch arm 158 such that when the saw blade 18 is fully inserted, the locking catch 162 aligns with and falls into a corresponding aperture 172 in the saw blade 18. As shown, the locking catch 162 may be disposed substantially at the center of the latch arm 158, between the first end 155 and second end 157. A latch arm spring 151 may be provided coupled to the blade clamp assembly 150. For example, the latch arm spring 151 may be disposed around the pivot pin 153, adjacent the latch arm 158, and cooperates with the main body 154 to bias the latch arm 158 toward a locked position, that is, maintaining a biasing engagement of the locking catch 162 with the saw blade 18.

Figure 22:
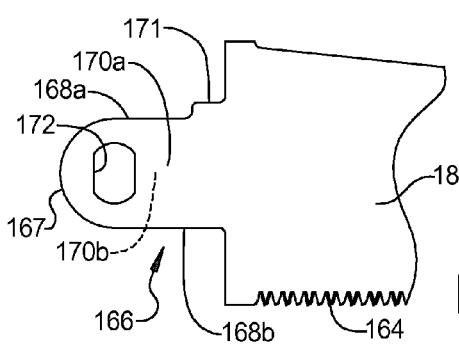
FIG. 22 is a partial side plan view illustrating the connection end of a saw blade.

FIG. 22 is a partial side plan view of a saw blade 18 illustrating the connection end. The saw blade 18 may include a cutting edge 164 and a mounting portion 166. The channel 156 of the main body 154 is defined to engage the mounting portion 166 of the saw blade 18 on at least four ends defined thereon, including first and second opposing outside edges 168a, 168b as well as first and second opposing faces 170a, 170b. The mounting portion 166 defines an aperture 172 that cooperates with the locking catch 162 to keep the saw blade 18 disposed within the channel 156, preventing movement in at least four directions. The saw blade 18 may also be provided with a step 171 portion that comes into contact with the main body 154 of the blade clamp assembly 150 to prevent over-insertion of the saw blade 18, effectively constraining the saw blade 18 in a fifth direction.

Figure 23:
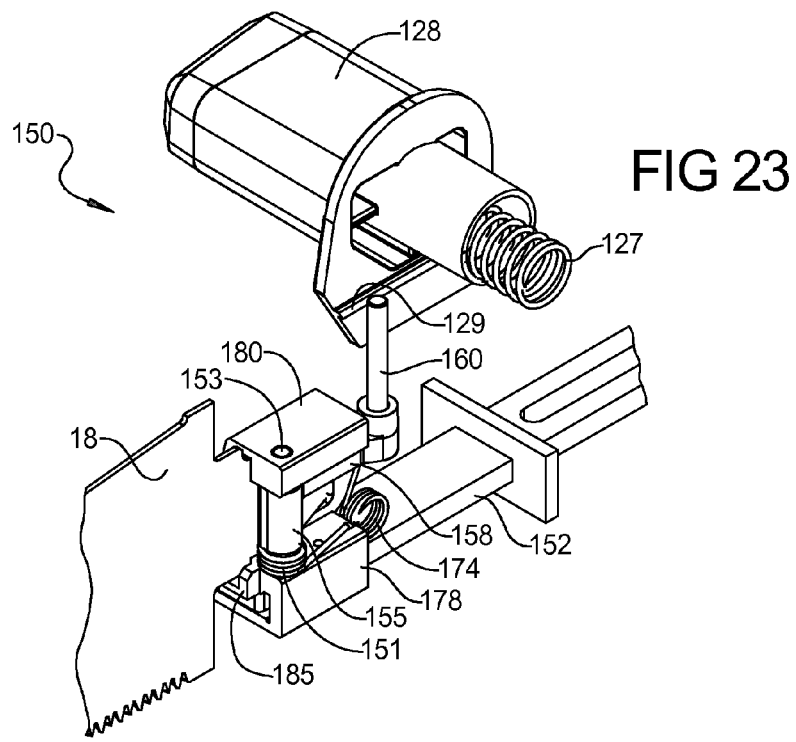
FIG. 23 is a partial perspective view of the blade clamp mechanism illustrating the actuator button in a biased or normal mode, wherein the saw blade is locked in place.
Figure 25:
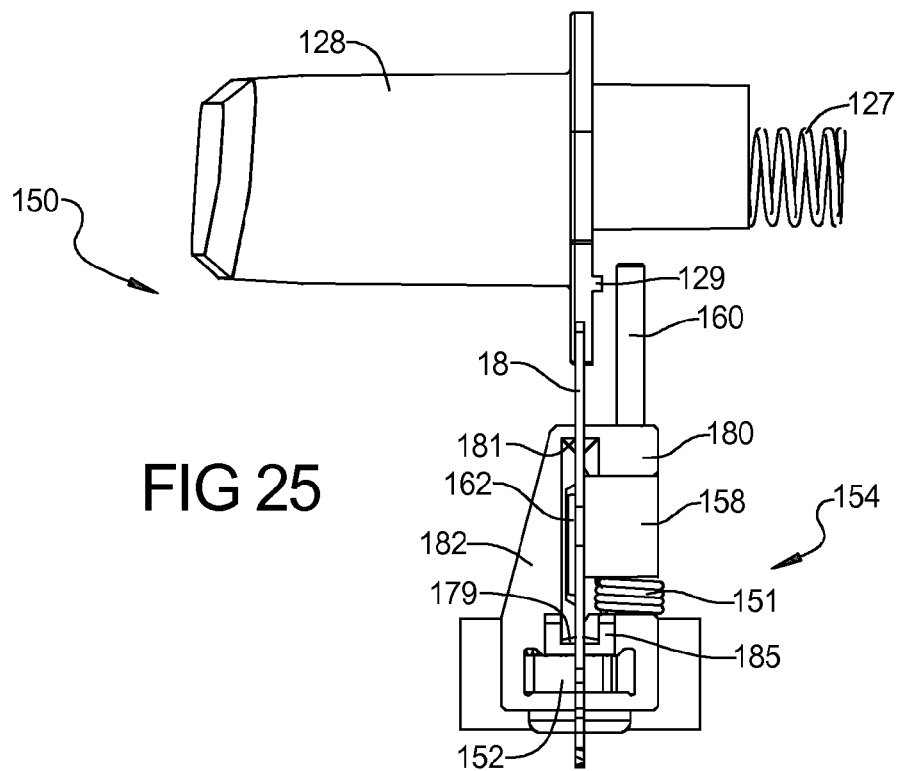
FIG. 25 is a front facing plan view of FIG. 23 illustrating the actuator button in a normal mode, wherein the saw blade is locked in place.

FIG. 23 is a partial perspective view of the blade clamp assembly 150 illustrating the blade release actuator button 128 in a normal mode, wherein the saw blade 18 is locked in place. As shown, the blade release actuator button 128 may be biased in an outward direction with an actuator spring 127 suitably disposed between the housing 112 and the blade release actuator button 128 such that when at rest, an engaging feature 129 of the blade release actuator button 128 is separated a distance from the release pin 160 (as shown in FIG. 25) to prevent inadvertent contact between the blade release actuator button 128 and the latch release pin 160 during operation of the power saw tool. This may minimize friction and wear during operation of the power saw tool 100.

Figure 24:
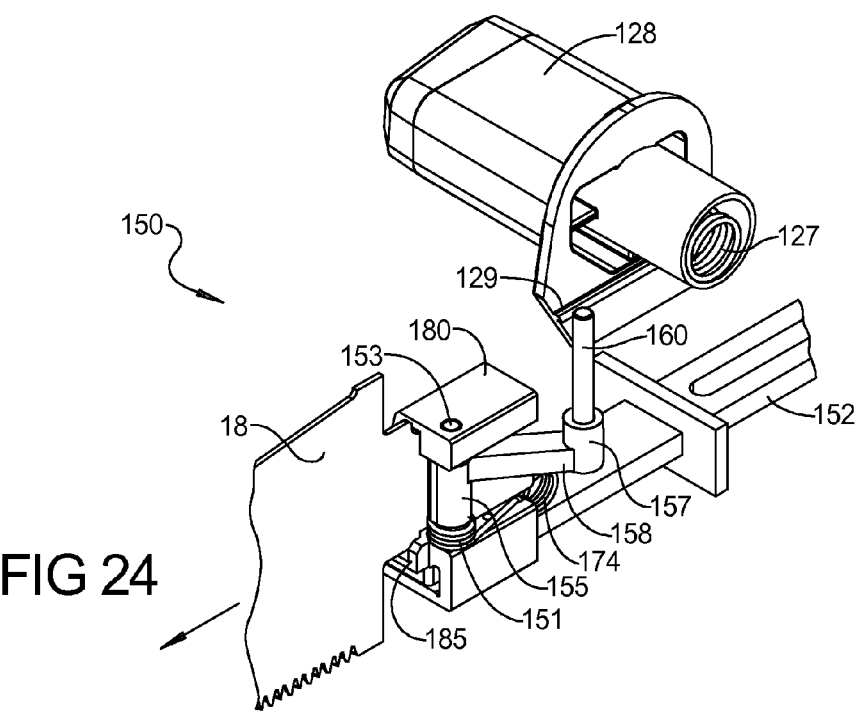
FIG. 24 is a partial perspective view of the blade clamp mechanism illustrating the actuator button in a depressed mode, wherein the saw blade is unlocked.

FIG. 24 is a partial perspective view of the blade clamp assembly 150 illustrating the blade release actuator button 128 in a depressed mode, wherein the saw blade 18 is unlocked from the blade clamp assembly 150. As shown, when force is applied to the latch arm release pin 160 in a direction contrary to the direction of force from the latch arm spring 151, the latch arm 158 is pivoted along pivot axis 159 a distance from its rest mode, thereby releasing the locking catch 162 from the aperture 172 of the saw blade 18. With reference to FIGS. 19-21, an eject spring 174 may be coupled to the reciprocating shaft 152 of the blade clamp assembly 150. Once the latch arm 158 disengages the locking catch 162 from the saw blade 18, an intermediate loop 176 of the eject spring 174 biases an edge 167 of the saw blade 18 in an outward direction, ejecting the saw blade 18 from the blade clamp assembly 150.

Figure 26:
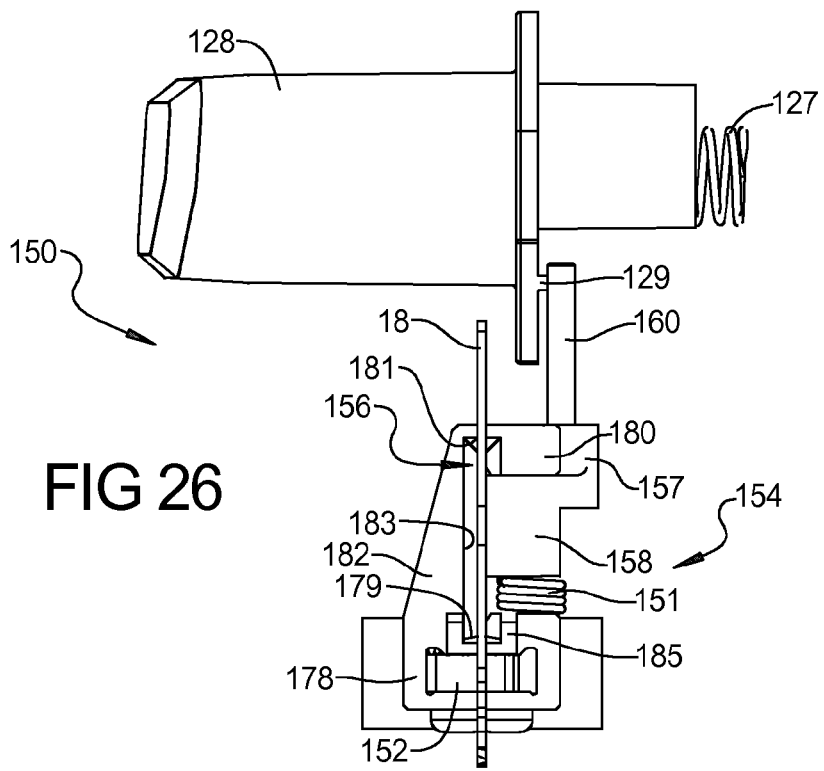
FIG. 26 is a front facing plan view of FIG. 24 illustrating the actuator button in a depressed mode, wherein the saw blade is unlocked.

FIG. 25 is a front facing plan view of FIG. 23 illustrating the blade release actuator button 128 in a normal mode, wherein the saw blade 18 is locked in place. FIG. 26 is a front facing plan view of FIG. 24 illustrating the blade release actuator button 128 in a depressed mode, wherein the saw blade 18 is unlocked. As best shown in FIGS. 25 and 26, the main body 154 of the blade clamp assembly 150 may include a base section 178 coupled to the reciprocating shaft 152 and partially defining a lower portion 179 of the channel 156; a top section 180 extending a distance from the base section 178 and partially defining an upper portion 181 of the channel 156; and a connecting arm 182 joining the base section 178 and the top section 180. The connecting arm 182 defines a first side portion 183 of the channel 156. The latch pivot pin 153 can pivotally mount the latch arm 158 between the base section 178 and the top section 180 of the main body 154. As shown in FIG. 26, an end of the latch arm 158 at least partially defines a second side portion 184 of the channel 156. With renewed reference to FIG. 22, the upper portion 181 of the channel 156 may engage the upper outside edge 168a of the saw blade 18, while the lower portion 179 of the channel 156 may engage the lower outside edge 168b of the saw blade 18. The base section 178 may also include an extending guide member 185 to assist a user in aligning the saw blade 18 for insertion with the channel 156.

Figure 27:
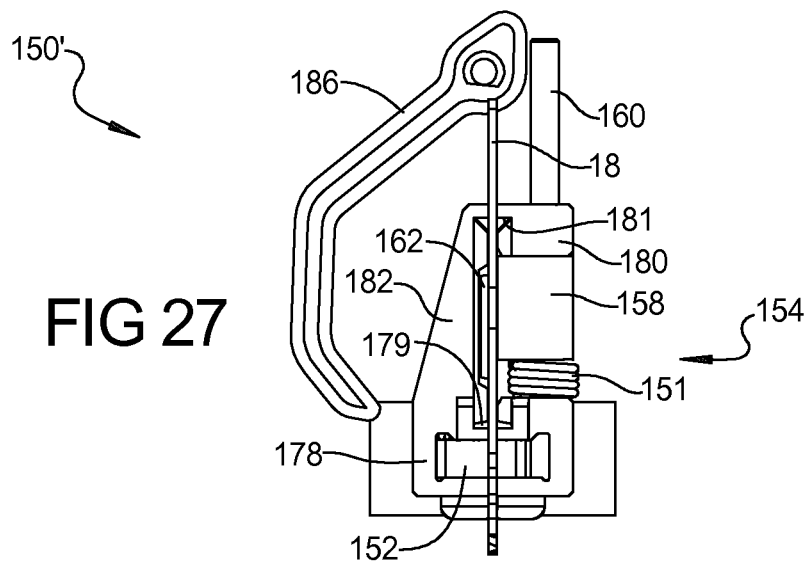
FIG. 27 is a front facing plan view of the blade clamp mechanism with an alternate lever actuator in a biased or normal mode, wherein the saw blade is locked in place.
Figure 28:
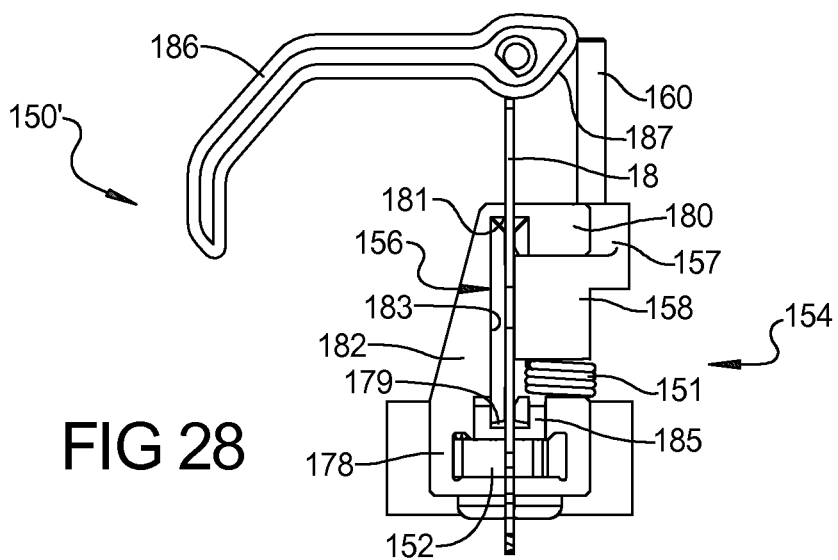
FIG. 28 is a front facing plan view of the blade clamp mechanism with an alternate lever actuator in a raised position, wherein the saw blade is unlocked.

FIG. 27 is a front facing plan view of another blade clamp assembly 150' with an alternate lever actuator 186 (in place of the button-type actuator) in a normal mode, wherein the saw blade 18 is locked in place. FIG. 28 is a front facing plan view of the blade clamp assembly 150' of FIG. 27 with the lever actuator 186 pivoted in a raised position, wherein the saw blade 18 is unlocked. The lever actuator 186 can be seen in the power saw tool 10 of FIG. 1. The lever actuator 186 may be spring biased (not shown) so when at rest, it is not in contact with the latch arm release pin 160. When the lever actuator 186 is raised by the user, a cam surface 187 rotates and bears against the latch arm release pin 160, deflecting the latch arm 158 and withdrawing the locking catch 162 from the saw blade 18. When the lever actuator 186 is released, it returns to its rest position (FIG. 27) under spring power, and the latch arm 158, biased by the latch arm spring 151, returns to the closed position.

Figure 31:
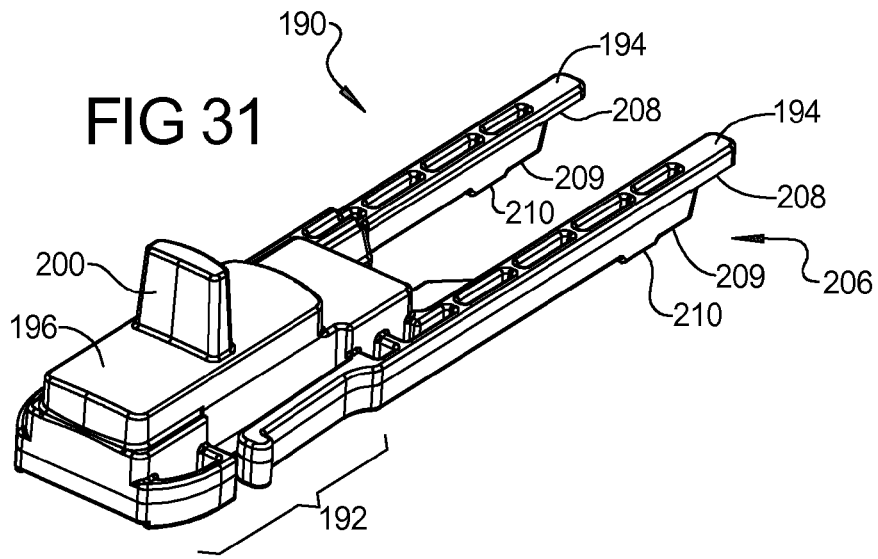
FIG. 31 is a perspective view of the speed limiter.

FIGS. 29-34 illustrate an exemplary trigger assembly 188 for use with variably controlling the speed and/or stroke of the power saw tool 100. In one example, displacement of the trigger switch 124 activates the motor 102 and the user can adjust the rotational speed of the motor by regulating the level at which the trigger switch is displaced. FIG. 29 is a partial schematic view of a handle portion 114 of the power saw tool 100, illustrating the placement of the trigger assembly 188 in the handle grip 115. In various aspects, the trigger assembly 188 includes a biased trigger switch 124 and a speed limiter 190. FIG. 30 is a perspective view of the speed limiter 190 in relation to the trigger switch 124 when in an off position, and FIG. 31 is a perspective view of the speed limiter. The speed limiter 190 may be a monolithic component, such as molded plastic, or may comprise a modular assembly of a plurality of components.

As shown, the speed limiter 190 may include a base portion 192 and two spaced apart and parallel side posts 194 extending a distance from the base portion 192. In various aspects, the base portion 192 and the side posts 194 are substantially planar and non-flexible. The base portion 192 may include a raised area 196 that is exposed to the environment through an aperture 198 defined in an exterior facing portion 115a of the handle grip 115 of the housing 112. As shown, a slider button 200 extends from the raised area 196 of the base portion 192.

The slider button 200 may extend from the speed limiter 190 in a direction substantially perpendicular to the side posts 194. The speed limiter 190 is movable in a linear direction "B" as noted in FIG. 30.

The trigger switch 124 may include a stationary component 202 disposed within the handle grip 115 that may house various circuitry (not shown) and a trigger button 125 exposed through an aperture 199 defined in an interior facing portion 115b of the handle grip 115 and movable in a linear direction "A" as noted in FIG. 30. As shown, the linear direction "A" of travel of the trigger button 125 may be substantially perpendicular to the linear direction "B" of travel of the speed limiter 190. The trigger button 125 of the trigger switch 124 may include two stop members 204 extending from opposing sides thereof and disposed adjacent to the stationary component 202.

As best shown in FIG. 30, the side posts 194 of the speed limiter 190 interface with and are adjacent to opposing sides 203, 205 of the stationary component 202 of the trigger switch 124. The work surface 206 of the respective side posts 194 cooperate with the stop members 204 to delimit the rearward travel of the trigger button 125. The work surface 206 may define a plurality of step portions 208, 209, 210 varying in thickness. One or more of the step portions 208, 209, 210 may be separated from one another by an angled transition area 212. The trigger switch 124 may include a rear abutment member 214, adapted to prevent or minimize the side posts 194 from moving in the "A" direction of travel.

Figure 32:
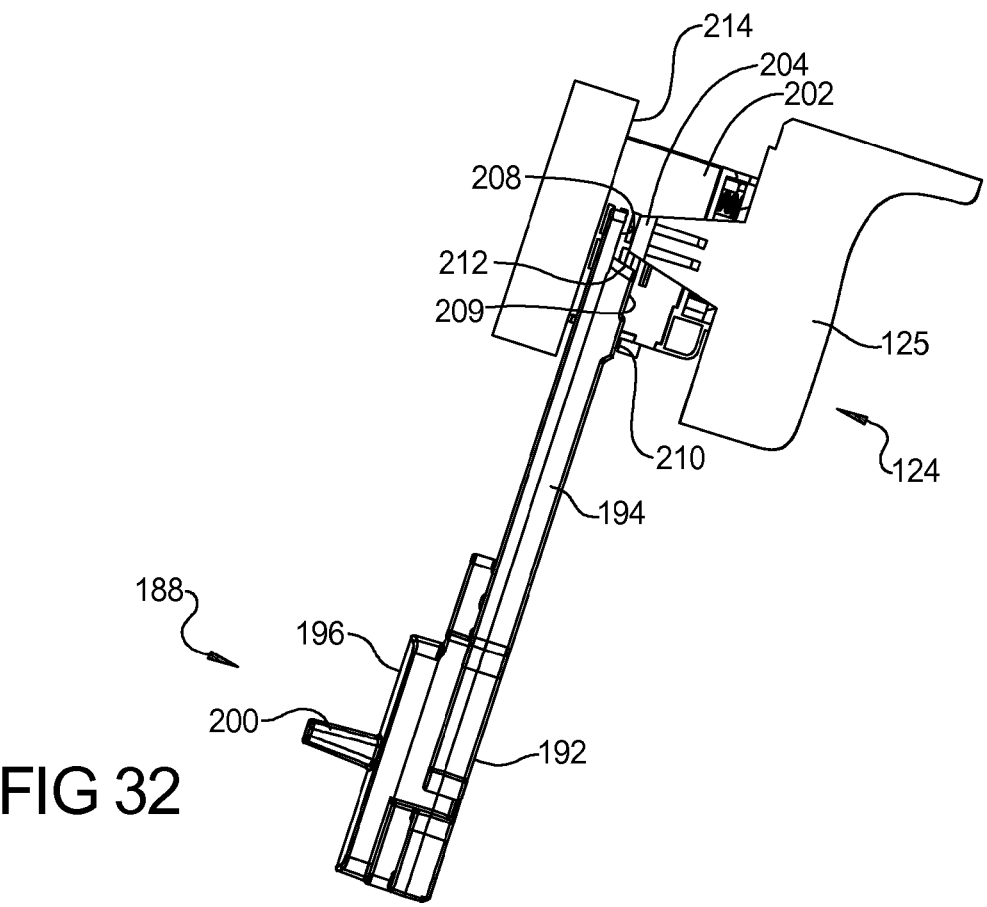
FIG. 32 is a side plan view of the trigger assembly of FIG. 29, wherein the trigger switch is partially depressed and limited by a first step portion of the speed limiter.
Figure 33:
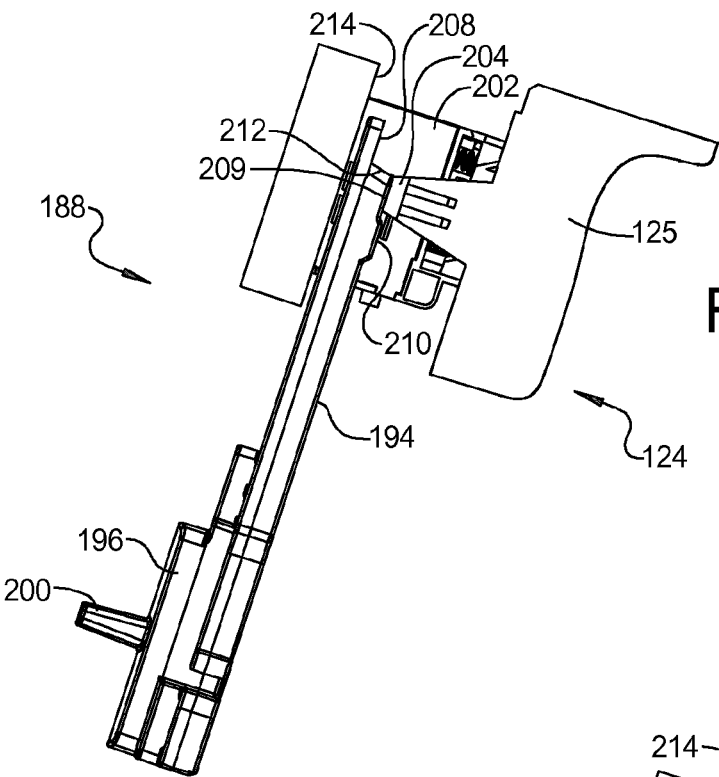
FIG. 33 is a side plan view of the trigger assembly of FIG. 29, illustrating the trigger switch depressed and limited by a second step portion of the speed limiter.
Figure 34:
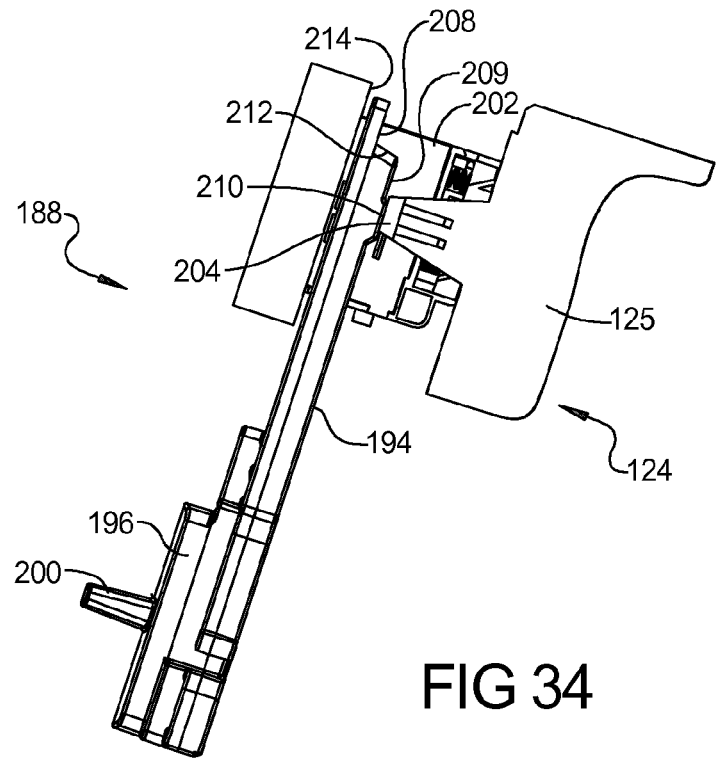
FIG. 34 is a side plan view of the trigger assembly of FIG. 29, illustrating the trigger switch depressed and limited by a third step portion of the speed limiter.

Each step portion 208, 209, 210 may delimit rearward travel of the trigger switch (and thus, saw speed) by a different amount. For example, a user may desire to vary the speed depending on the material being cut. A faster speed can be used on wood, while a slower speed may work better with plastic, and a further slower speed with metals. FIG. 32 is a side plan view of the trigger assembly of FIG. 29, wherein the trigger button 125 can be fully depressed until the stop members 204 contact the first step portion 208. FIG. 33 is a side plan view of the trigger assembly of FIG. 29, illustrating the trigger button 125 depressed and limited by a second step portion 209. FIG. 34 is a side plan view of the trigger assembly of FIG. 29, illustrating the trigger button 125 depressed and limited by a third step portion 210 of the speed limiter 190.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power saw tool, comprising:
a motor;
a reciprocating mechanism coupled to motor, the reciprocating mechanism being adapted to drive a reciprocating shaft coupled to a saw blade; and
a housing comprising a body portion and a handle portion, the body portion adapted to house the motor and reciprocating mechanism, the handle portion defining a handle grip adapted to house a trigger assembly, the trigger assembly comprising:
a biased trigger button slidably movable in a first linear direction, the trigger button comprising a stop member, wherein displacement of the trigger button controls a variable speed operation of the motor; and
a speed limiter housed within the handle grip and slidably movable with respect to the trigger button, the speed limiter comprising a base portion including an actuator button partially extending through the handle grip and a post extending from the base portion, the post cooperating with the stop members to delimit rearward travel of the trigger button, thereby restricting the speed of the motor;
wherein the post comprises a plurality of step portions varying in thickness, each step portion delimiting rearward travel of the trigger button by a different amount.

2. The power saw tool of claim 1, further comprising an angled ramp area disposed between the step portions.

3. The power saw tool of claim 1, wherein the speed limiter is slidably movable in a second linear direction, the second linear direction being substantially perpendicular to the first linear direction.

4. A power saw tool, comprising:
a motor;
a reciprocating mechanism coupled to motor, the reciprocating mechanism being adapted to drive a reciprocating shaft coupled to a saw blade; and
a housing comprising a body portion and a handle portion, the body portion adapted to house the motor and reciprocating mechanism, the handle portion defining a handle grip adapted to house a trigger assembly, the trigger assembly comprising:
a biased trigger button slidably movable in a first linear direction, the trigger button comprising two stop members, each stop member extending from an opposing side of the trigger button, wherein displacement of the trigger button controls a variable speed operation of the motor; and
a speed limiter housed within the handle grip and slidably movable with respect to the trigger assembly, the speed limiter comprising a base portion including a slider button partially extending through the handle grip and two spaced apart and parallel side posts extending from the base portion, the side posts being disposed adjacent to opposing sides of the trigger assembly and cooperating with the respective stop members to delimit rearward travel of the trigger button, thereby restricting the speed of the motor.

5. The power saw tool of claim 4, wherein the side posts comprise a plurality of step portions varying in thickness, each step portion delimiting rearward travel of the trigger button by a different amount.

6. The power saw tool of claim 5, further comprising an angled ramp area disposed between the step portions.

7. The power saw tool of claim 4, wherein the speed limiter is slidably movable in a second linear direction, the second linear direction being substantially perpendicular to the first linear direction.

8. The power saw tool of claim 7, wherein the trigger assembly further comprises at least one abutment member adapted to prevent the side posts from moving in the first linear direction.

9. The power saw tool of claim 4, wherein the trigger switch extends in an outward direction from an interior facing portion of the handle grip and the slider button extends in an outward direction from an exterior facing portion of the handle grip, opposite from the interior facing portion.

10. The power saw tool of claim 4, wherein the base portion and side posts of the speed limiter are substantially planar and non-flexible.

11. The power saw tool of claim 4, wherein the slider button extends from the base portion in a direction substantially perpendicular to the side posts.

12. A power saw tool, comprising:
- a motor;
- a reciprocating mechanism coupled to the motor, the reciprocating mechanism configured to drive a reciprocating shaft coupled to a saw blade; and
    - a housing comprising a body portion and a handle portion, the body portion adapted to house the motor and the reciprocating mechanism;
- a trigger button configured to be actuated by a user and which controls a variable speed operation of the motor; and
- a speed limiter actuator configured to be actuated by a user, wherein operation of the speed limiter actuator changes the maximum speed at which the motor can be operated by the trigger button;
- wherein the handle has a longitudinal axis and comprises a first half along the longitudinal axis and a second half along the longitudinal axis;
- wherein the trigger button is located on the first half of the handle;
- wherein the speed limiter actuator is located on the second half of the handle
- wherein the speed limiter actuator actuates a speed limiter housed within the handle grip, the speed limiter being slidably movable with respect to the trigger button, the speed limiter comprising a base portion including an actuator button partially extending through the handle grip and a post extending from the base portion, the post cooperating with the stop members to delimit rearward travel of the trigger button; and
- wherein the post comprises a plurality of portions of varying thickness, the portions delimiting rearward travel of the trigger button by different amounts.

13. The power saw tool of claim 12, wherein the handle has an interior face which faces toward the body portion;
- wherein the trigger button is located on the interior face; and
- wherein the speed limiter actuator is located away from the interior face.

14. The power saw tool of claim 12, wherein the speed limiter actuator includes at least three distinct settings representing at least three speed settings.

15. The power saw tool of claim 12, wherein the speed limiter actuator is remote from the trigger button.

16. The power saw tool of claim 12, wherein operation of the speed limiter actuator varies a maximum displacement of the trigger button.

17. The power saw tool of claim 12, further comprising a stop portion coupled to and moveable with the trigger button; and
- a limiter stop coupled to and moveable with the speed limiter actuator;
- wherein the limiter stop abuts the stop portion to prevent further displacement of the trigger button.

18. The power saw tool of claim 17, wherein the speed limiter actuator is moveable to a plurality a positions corresponding to a plurality of speed settings;
- wherein the limiter stop comprises a plurality of setting portions, each setting portion corresponding to one of the plurality of speed settings and limiting maximum displacement of the trigger button a different amount.

19. The power saw tool of claim 12, wherein the handle has an interior face which faces toward the body portion;
- wherein the trigger button is located on the interior face; and
- wherein the speed limiter actuator is located on an exterior face which is opposite the interior face.

* * * * *